United States Patent
Zemp

(10) Patent No.: US 9,941,989 B2
(45) Date of Patent: Apr. 10, 2018

(54) CODED IMAGING AND MULTI-USER COMMUNICATIONS SYSTEMS

(71) Applicant: THE GOVERNORS OF THE UNIVERSITY OF ALBERTA, Edmonton (CA)

(72) Inventor: Roger Zemp, Edmonton (CA)

(73) Assignee: The Governors of the University of Alberta, Edmonton, Alberta (CA)

(*) Notice: Subject to any disclaimer, the term of this patent is extended or adjusted under 35 U.S.C. 154(b) by 0 days.

(21) Appl. No.: 14/845,000

(22) Filed: Sep. 3, 2015

(65) Prior Publication Data
US 2016/0065323 A1 Mar. 3, 2016

Related U.S. Application Data
(60) Provisional application No. 62/045,466, filed on Sep. 3, 2014.

(51) Int. Cl.
| | |
|---|---|
| *H04B 1/00* | (2006.01) |
| *H04J 13/00* | (2011.01) |
| *G01S 13/90* | (2006.01) |
| *G01S 15/89* | (2006.01) |
| *H04B 1/709* | (2011.01) |
| *G01S 13/79* | (2006.01) |

(52) U.S. Cl.
CPC .......... *H04J 13/0022* (2013.01); *G01S 13/79* (2013.01); *G01S 13/90* (2013.01); *G01S 15/8904* (2013.01); *H04B 1/709* (2013.01)

(58) Field of Classification Search
CPC ...... H04B 1/707; H04B 1/709; H04B 1/7075; H04B 1/7093; H04B 2201/709709; H04B 2201/70703; H04J 13/10; H04J 13/00; H04J 13/0022; H04J 13/0048; H04J 13/12
USPC ........ 375/142, 141, 140, 130, 295, 219, 316
See application file for complete search history.

(56) References Cited

U.S. PATENT DOCUMENTS

| | | | |
|---|---|---|---|
| 6,048,315 A | 4/2000 | Chiao et al. | |
| 2014/0117809 A1 | 5/2014 | Zemp | |
| 2015/0098393 A1* | 4/2015 | Tofighbakhsh | H04W 24/02 370/329 |
| 2015/0247921 A1* | 9/2015 | Rothberg | A61B 8/4254 367/135 |

OTHER PUBLICATIONS

Bae, Moo-Ho et al., Orthogonal Golay Code Based Ultrasonic Imaging Without Reducing Frame Rate, 2002 IEEE Ultrasonics Symposium, 2002, p. 1705.
Gran, Fredrik et al., Spatial encoding using a code division technique for fast ultrasound imaging, IEEE Transactions on Ultrasonics, Ferroelectrics and Frequency Control, 2008, 12-23, 55(1).

(Continued)

*Primary Examiner* — Zewdu Kassa
(74) *Attorney, Agent, or Firm* — Anthony R. Lambert

(57) ABSTRACT

A coded imaging and multi-user communications systems using novel codes, algorithms to develop such codes, and technological implementations to use the codes for various types of systems involving multiple (or single) transmitters and multiple (or single) receivers of signals (which could include but are not limited to electromagnetic radiation, acoustic waves, other types of waves or data) as a function of time-or-space.

9 Claims, 9 Drawing Sheets

(56) References Cited

OTHER PUBLICATIONS

Madore, Bruno et al., Accelerated focused ultrasound imaging, IEEE Transactions on Ultrasonics, Ferroelectrics and Frequency Control, Author manuscript, 2010.
Misaridis, Thanassis X. et al., Space-time encoding for high frame rate ultrasound imaging, Ultrasonics, 2002, 593-597, 40.

* cited by examiner

CODED IMAGING AND MULTI-USER COMMUNICATIONS SYSTEMS

FIELD

Coded systems for imaging and communications.

BACKGROUND

Coded excitation is widely used in various ultrasound, radar, sonar and other imaging systems as well as in communication system. Coded excitations can be used for different purposes, including enhancing SNR by using codes with large time-bandwidth product, implementing code-division multiplexing, among others. Literature Review: Complementary Codes, Barker Codes, Golay Codes, Pseudorandom Noise, Chirps,

SUMMARY

In an embodiment, there is disclosed a system comprising a multiplicity of transmitters and receivers, the transmitters comprising transmitting elements and processing parts, the processing parts adapted to cause the transmitting elements to transmit a code taken from a set of codes, the set of codes being a set of sparse-repeating interval (SRI) codes, non-repeating interval (NRI) codes or Hadamard NRI codes.

In an embodiment, there is disclosed an imaging system comprising: a transmitter having multiple transmitting elements, each transmitting element having a processing part, the processing part of the transmitter adapted to cause each transmitting element of the multiple transmitting elements to transmit a different code of a set of codes in which the codes are selected from the group consisting of sparse-repeating interval (SRI) codes, non-repeating interval (NRI) codes and Hadamard NRI codes; and a receiver having multiple receiving elements and a receiving processing part, the receiving processing part adapted to receive signals formed by the scattering from an object to be imaged of the codes transmitted from the transmitter and to apply a comparing algorithm comparing the received signals with the transmitted codes to obtain a synthetic aperture data set, and processing the synthetic aperture data set to form an image.

In an embodiment, there is disclosed an asynchronous Code-Division Multiple Access (CDMA) communication system comprising: multiple transmitters, each transmitter having a processing part adapted to cause the transmission by the transmitter of a respective signal comprising a respective SRI or NRI code or key sequence and a respective coded message constructed by correlating or convolving a respective message with a respective code of the set of SRI/NRI codes, each transmitter using a different respective key sequence and a different respective code than each of the other transmitters; and at least one receiver having a receiving processing part, the receiving processing part adapted to receive the transmitted signals and to use the respective key sequences to determine which signal came from which transmitter, and to decode a coded message of the respective coded messages by applying a comparing algorithm comparing the coded message with the respective code of the set of codes.

In various embodiments, the transmitter and receiver may share transducers; the comparing algorithm is cross-correlation or convolution; the comparing algorithm is a matrix inversion to solve P=Ae+n where P is the set of data to estimate and A is a system matrix with n being noise, or, $$\hat{e}_{kj}(t) = IDFT\left\{\sum_{(i)} w_j^{(i)} \hat{P}_k^{(i)}(\omega) \frac{\tilde{C}_j^{*(i)}(\omega)}{\sum_{i'} S_j^{(i')}(\omega)}\right\}$$

which estimates the data transmitted by transmitter j and received with receiver k; the transmitters are virtual transmitters, each virtual transmitter being realized by using a multiplicity of elements to focus at a location, to become the virtual transmitter location, the respective key sequences are the respective codes, the set of codes is designed so that for a length P all possible autocorrelations have P zero values on either side of the mainlobes.

A set of SRI/NRI/Hadamard-NRI sequence may be generated by selecting a sequence of intervals by a method comprising:
A) Providing a seed sequence of intervals;
B) finding a new interval that satisfies the properties of:
  i) the new interval and the sum of the new interval with the sum of the intervals from each point in the sequence to the end of the sequence are not existing intervals in the sequence
  ii) the new interval and the sum of the new interval with the sum of the intervals from each point in the sequence to the end of the sequence are not equal to any sum of the intervals from the beginning of the sequence up to any point in the sequence;
  iii) the new interval and the sum of the new interval with the sum of the intervals from each point in the sequence to the end of the sequence is not equal to any sum of the intervals from any point in the sequence to the end of the sequence;
C) appending the new interval to the sequence of intervals;
D) repeating steps B and C until the sequence of intervals has a desired length; and generating each code of the set of codes by creating a respective vector of non-zero numbers separated by zeros where the intervals between non-zero numbers is equal to the sequence of intervals.

A set of SRI/NRI sequences may be generated by, the method comprising: providing an initial set of sequences of intervals, which may be the empty set; creating a new sequence of intervals by:
A) providing a first interval;
B) selecting a next interval of the sequence of intervals with the following properties:
  i) the next interval and the sum of the next interval with the sum of the intervals from each point in the new sequence to the end of the new sequence are not existing intervals in the new sequence;
  ii) the next interval and the sum of the next interval with the sum of the intervals from each point in the new sequence to the end of the new sequence are not equal to any sum of the intervals from any point in the new sequence to the end of the new sequence; iii) the next interval and the sum of the next interval with the sum of the intervals from each point in the new sequence to the end of the new sequence are not equal to any sum of the intervals from the beginning of the new sequence to any point in the new sequence; and
  iv) the appending of the next interval to the new sequence would not result in a consecutive pair of not-necessarily-elementary-intervals already present in a sequence of intervals in the set of sequences of intervals, where the term "not-necessarily-elementary-interval" is understood to include sums of one or more consecutive intervals;
C) appending the next interval to the new sequence of intervals; and
D) repeating the steps B-C until the new sequence of intervals has a desired length; appending the new sequence of intervals to the set of sequences of intervals; repeating the steps of creating a new sequence of intervals and appending the new sequence of intervals to the set of sequences of intervals until the set of sequences of intervals has a desired size; and generating the set of codes by creating for each sequence of the set of sequences of intervals a vector of non-zero numbers separated by zeros where the intervals between the non-zero numbers are taken from the respective sequence, such that the vector of intervals between adjacent non-zero values of a specific SRI/NRI code is different than the vector of intervals corresponding to other codes in the set and such that the set of codes constitute a BSNO code set.

BRIEF DESCRIPTION OF THE DRAWINGS

There will now be described embodiments of the coded imaging and multiuser communications systems in which like reference characters denote like elements, by way of example, in which.

DETAILED DESCRIPTION

Figure 1A:
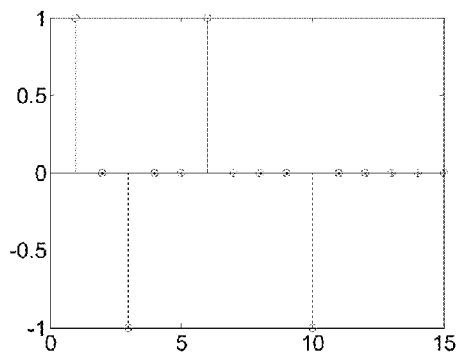
FIG. 1A shows NRI code v2 derived from the second row of the 4×4 Hadamard Matrix.

We disclose coded imaging and multi-user communications systems using novel codes, algorithms to develop such codes, and technological implementations to use the codes for various types of systems involving multiple (or single) transmitters and multiple (or single) receivers of signals (which could include but are not limited to electromagnetic radiation, acoustic waves, other types of waves or data) as a function of time-or-space.

For example, we disclose novel non-repeating interval (NRI) codes and Hadamard non-repeating interval codes (to be described below) including The use of codes with NRI properties for various types of systems involving multiple (or single) transmitters and multiple (or single) receivers of signals (which could include but are not limited to electromagnetic radiation, acoustic waves, other types of waves or data) as a function of time-or-space. Such systems could include imaging system (like ultrasound, sonar, radar, etc.) and multi-user communication systems.

Algorithms to synthesize NRI codes and Hadamard NRI codes.

Application of NRI codes for a myriad of possible uses.

We detail possible ultrasound, radar and sonar system architectures which may use NRI codes.

The use of NRI codes to generate fast ultrasound/radar/sonar images by transmitting a different code from each element and receiving on all (or a subset of elements) then implementing processing to recover high quality images.

The use of NRI codes as an effective replacement of pseudo-random codes in Asynchronous Code Division Multiple Access Communications, with the potential advantage of ensuring clutter artifacts are bounded.

An element can be, for example, an antenna and/or a transducer. Elements can be transmitting elements, receiving elements, or both. A transducer is a device capable of converting electrical signals to another type of energy (e.g. optical, mechanical, etc) and/or vice versa.

We also disclose the development and use of a linear-least-squares algorithm for estimating synthetic aperture data for a given pulse sequence. The pulse sequence could involve NRI or other codes.

Definitions

Code: A vector of numbers with real, complex, integer, binary, or other values.

Z-Interval: The distance in samples or number of vector-elements between specified non-zero values of a code. In this document when we refer to an interval it will mean a Z-interval unless otherwise specified.

Bounded-Sidelobe Near Orthogonal (BSNO) Code: a code taken from a set of codes, each code being composed of a sequence of numbers, the set of codes having the properties of: the cross correlation magnitude between each pair of two different codes of the set is less than a specified value, a, evaluated at all values of lag time; the autocorrelation magnitude of each code of the set is bounded by a specified value, b, for all lag times other than zero; The zero-lag autocorrelation of each code of the set is equal to the sum of the squares of each element of the given code, and is not bounded by a or b.

Sparse-Repeating-Interval (SRI) Code: a code taken from a set of codes, each code comprised of a vector of number with both zero and non-zero elements, such that the set of all possible Z-intervals (defined above) for each respective code may have some repeated values in the set. A set of SRI codes can be shown to have the properties of BSNO codes, but there may be BSNO codes which are not SRI codes.

Non-Repeating Interval (NRI) Code: a code taken from a set of SRI codes in which the set of all possible Z-intervals (defined above) for each respective code has no repeats.

These NRI codes have the following additional properties: the sum of the codes of the set, evaluated by summation of the numbers at each position in the respective sequences of numbers of the codes of the set, has a non-zero value for a particular position in the respective sequences and only for the particular position; the sum of the cross correlations of each code of the set with itself has a non-zero value for the particular position in the respective sequences and only for the particular position; and the sum of the cross correlations of all pairs of codes of the set has a non-zero value for the particular position in the respective sequences and only for the particular position.

Hadamard-NRI Codes: These are sets of NRI codes where non-zero values in the vector of values are taken from a respective row of a Hadamard matrix, or the non-zero numbers of each vector are taken from a respective column of a Hadamard Matrix.

Properties of NM Sequences/Codes:

Our initial work uses tri-state codes having numbers taking values of −1, 0, or 1. This can be generalized to other real or complex values. Properties of these NRI codes include:

The possible intervals between non-zero bits are not repeated within a given code The cross-correlation between different codes is bounded by unity magnitude The zero-lag autocorrelation has a magnitude of M for a code with M non-zero bits The autocorrelation at non-zero lags is bounded by unity magnitude Properties of Hadamard NRI Codes:

When the non-zero bits of an NRI sequence are populated with bits from a Hadamard sequence (rows or columns of a Hadamard Matrix) we form Hadamard NRI codes. For a given sequence of intervals, we form a complete set of Hadamard NRI codes by creating an NRI code for each row or column of the corresponding Hadamard matrix. These Hadamard NRI codes have the properties of NRI codes but have the following additional properties:

The sum of the autocorrelations of all Hadamard NRI codes in the complete set of Hadamard NRI codes results in a perfect delta function.

The sum of all possible cross-correlation pairs is an ideal delta function.

Desired Codes:

We desire a set of codes such that a different code can be transmitted simultaneously on a set of transducer elements or transmitters then received signals from a set of elements/receivers can be decoded for each transmit code such that there is minimal interference between codes after decoding. For ultrasound imaging this could be used to effectively acquire a set of synthetic transmit-receive aperture data with only one effective transmit event. This could be particularly valuable for high-frame-rate imaging and 3D imaging. In the discussion that follows we create a modelling framework for ultrasound imaging however the principles apply to any multi-transmitter multi-receiver system.

Consider an array/multiplicity of N transducer elements/transmitters. The voltage signals driving each of these elements can be represented as $$V(t) = [v_1(t)\ v_2(t)\ \ldots\ v_N(t)]$$

where $v_n(t)$ is the voltage as a function of time driving element n, the discrete-time form of which can be written as vector $v_n = [v_{n1}\ v_{n2}\ \ldots\ v_{nM}]^T$ of M time-samples.

We desire to transmit a set of coded time-sequences such that the cross-correlation between sequences is close to zero and the autocorrelation is approximately a delta function:

$$v_n(t) \star v_m(t) \approx \delta_{nm}(t) = \begin{cases} 0 & \text{if } n \neq m \\ \delta(t) & \text{if } n = m \end{cases}$$

Received signals on element/receiver k are given as $$r_k(t) = \sum_{l,j} v_l(t) * h_{Tx}(t, x_l \to x_j) * s(t, x_j) * h_{Rx}(t, x_j \to x_k)$$

and represent the signal due to an ensemble of scatterers at locations $x_j$ and using elements at locations $x_l$ to transmit. Here $h_{Tx}$ (t, $x_l \to x_j$) is the transmitter spatio-temporal impulse-response, s(t, $x_j$) is the scatterer response at location $x_j$ (often modelled by a delta function in time multiplied by the scattering amplitude) and $h_{Rx}$ (t, $x_j \to x_k$) is the receiver spatio-temporal impulse response.

If effectively orthogonal transmit sequences were used, we could retrieve an effective full synthetic aperture data set with a single transmission. To see this, we can estimate the effective signal $r_{mk}(t)$ transmitted from element m and received on element k by filtering the receive signal $r_k$ (t) by cross-correlating with $v_m(t)$:

$$\hat{r}_{mk}(t) = r_k(t) \star v_m(t) \approx \sum_{l,j} h_{Tx}(t, x_m \to x_j) * s(t, x_j) * h_{Rx}(t, x_j \to x_k)$$

Once the full synthetic aperture data set is available, transmit-receive synthetic aperture delay-and-sum focusing can enable high spatial-resolution and high contrast-to-noise images. Previously this would require N transmit events for N transducer elements. In contrast our proposed method would require only a single transmit event, but with different coded signals sent from each element during one transmit event. Thus far, however, this discussion is purely hypothetical because we have yet to identify such codes.

This is approximately true for codes based on random (e.g. white Gaussian) noise if the sequences are sufficiently long, however, most ultrasound system architectures do not permit arbitrary waveform generation for each channel. Ultrasound systems commonly use tri-state pulsers to simplify driving electronics. We desire tri-state codes with states {−1,0,1} which satisfy minimal (instead of exact) correlation and orthogonality conditions with the following constraints:

$|\rho_{nm}(\tau)| \leq 1\ \forall \tau$ if $n \neq m$ $\rho_{nm}(0) = 0$ if $n \neq m$ $\rho_{mm}(0) = M\ \forall m$ For codes of length M, and where $\rho_{nm}$ (T) is the cross correlation between $v_n(t)$ and $v_m$ (t) evaluated at lag τ. In this way the mainlobe-to-sidelobe ratio will be equal to M, and the sidelobe levels will be bounded for arbitrary code lengths.

Finally, desirable requirements are:

$$\sum_{m=1}^{M} v_m(t) = \delta(t)$$

$$\sum_{m=1}^{M} v_m(t) \star v_m(t) = \delta(t)$$

$$\sum_{m=1}^{M} \sum_{n=1}^{M} v_n(t) \star v_m(t) = \delta(t)$$

The task now is to identify tri-state codes that conform to such conditions.

Non-Repeating Interval (NRI) Codes and Hadamard NRI Codes:

We present a novel set of codes that meet these requirements. To date such codes have not been published to our knowledge. There may exist many such codes. We focus on one method of constructing such codes. We call these Non-Repeating Interval (NRI) codes.

To construct NRI codes, we interpose varying sequences of zeros between non-zero bits. For Hadamard NRI codes the non-zero bits are selected from a Hadamard sequence. Intervals between non-zero code-bits are chosen so that when combined with other sequential intervals, the newly formed intervals are not duplicates of existing intervals, otherwise more than one pair of non-zero bits would multiply in a cross-correlation at given lags, producing a outcome with magnitude potentially greater than unity. At zero lag, the autocorrelation of these sequences will produce a value equal to the sum of the square of the bits of the Hadamard sequence, totaling M for an M-bit Hadamard code. Cross-correlation between asimilar codes at zero lag will result in a value of zero since Hadamard sequences are mutually orthogonal.

4-Bit Hadamard NRI Code Example:

To see this consider an example. Given M=4, the Hadamard matrix is given as $$H = \begin{bmatrix} +1 & +1 & +1 & +1 \\ +1 & -1 & +1 & -1 \\ +1 & -1 & -1 & +1 \\ +1 & +1 & -1 & -1 \end{bmatrix}$$

Hadamard sequences are encoded as the rows or columns of H. To generate the corresponding NRI codes, we interpose aperiodic intervals of zeros.

| | | | | | | | | | | |
|---|---|---|---|---|---|---|---|---|---|---|
| $v_1$ | 1 | 0 | 1 | 0 | 0 | 1 | 0 | 0 | 0 | 1 |
| $v_2$ | 1 | 0 | -1 | 0 | 0 | 1 | 0 | 0 | 0 | -1 |
| $v_3$ | 1 | 0 | -1 | 0 | 0 | -1 | 0 | 0 | 0 | 1 |
| $v_4$ | 1 | 0 | 1 | 0 | 0 | -1 | 0 | 0 | 0 | -1 |
| Intervals | | 2 | | 3 | | | | 4 | | |
| | | | 5 | | | | | | | |
| | | | | | | 7 | | | | |
| | | | | | | | 9 | | | |

The code $v_2$ from the above table is illustrated in graphical form in FIG. 1A. Note that we have chosen the intervals in such a way that there are no repeated intervals in the sequence. In this case we have chosen intervals [2,3,4]. Consider cross-correlating $k_2$ and $k_4$.

$v_4$ at lag 9 relative to $v_2$:

| | | | | | | | | | | | | | | | | | | | | | Σ |
|---|---|---|---|---|---|---|---|---|---|---|---|---|---|---|---|---|---|---|---|---|---|
| $v_2$ | 1 | 0 | -1 | 0 | 0 | 1 | 0 | 0 | 0 | -1 | | | | | | | | | | | |
| $v_4$ | | | | | | | | | | 1 | 0 | 1 | 0 | 0 | -1 | 0 | 0 | 0 | -1 | | |
| product | 0 | 0 | 0 | 0 | 0 | 0 | 0 | 0 | 0 | -1 | 0 | 0 | 0 | 0 | 0 | 0 | 0 | 0 | 0 | 0 | -1 |

$v_4$ at lag 5 relative to $v_2$:

| | | | | | | | | | | | | | | | | | | | Σ |
|---|---|---|---|---|---|---|---|---|---|---|---|---|---|---|---|---|---|---|---|
| $v_2$ | 1 | 0 | -1 | 0 | 0 | 1 | 0 | 0 | 0 | -1 | | | | | | | | | |
| $v_4$ | | | | | | 1 | 0 | 1 | 0 | 0 | -1 | 0 | 0 | 0 | -1 | | | | |
| prod | 0 | 0 | 0 | 0 | 0 | 1 | 0 | 0 | 0 | 0 | 0 | 0 | 0 | 0 | 0 | 0 | 0 | 0 | 1 |

$v_4$ at lag 1 relative to $v_2$:

| | | | | | | | | | | | | | | | | | | | Σ |
|---|---|---|---|---|---|---|---|---|---|---|---|---|---|---|---|---|---|---|---|
| $v_2$ | 1 | 0 | -1 | 0 | 0 | 1 | 0 | 0 | 0 | -1 | | | | | | | | | |
| $v_4$ | | 1 | 0 | 1 | 0 | 0 | -1 | 0 | 0 | 0 | -1 | | | | | | | | |
| prod | 0 | 0 | 0 | 0 | 0 | 0 | 0 | 0 | 0 | 0 | 0 | 0 | 0 | 0 | 0 | 0 | 0 | 0 | 0 |

$v_4$ at lag 0 relative to $v_2$:

| | | | | | | | | | | | | | | | | | | | Σ |
|---|---|---|---|---|---|---|---|---|---|---|---|---|---|---|---|---|---|---|---|
| $v_2$ | 1 | 0 | -1 | 0 | 0 | 1 | 0 | 0 | 0 | -1 | | | | | | | | | |
| $v_4$ | 1 | 0 | 1 | 0 | 0 | -1 | 0 | 0 | 0 | -1 | | | | | | | | | |
| prod | 1 | 0 | -1 | 0 | 0 | -1 | 0 | 0 | 0 | 1 | 0 | 0 | 0 | 0 | 0 | 0 | 0 | 0 | 0 |

$v_4$ at lag −9 relative to $v_2$:

| | | | | | | | | | | | | | | | | | | | | Σ |
|---|---|---|---|---|---|---|---|---|---|---|---|---|---|---|---|---|---|---|---|---|
| $v_2$ | | | | | | | | | | 1 | 0 | -1 | 0 | 0 | 1 | 0 | 0 | 0 | -1 | |
| $v_4$ | 1 | 0 | 1 | 0 | 0 | -1 | 0 | 0 | 0 | -1 | | | | | | | | | | |
| prod | 0 | 0 | 0 | 0 | 0 | 0 | 0 | 0 | 0 | -1 | 0 | 0 | 0 | 0 | 0 | 0 | 0 | 0 | 0 | -1 |

Figure 1B:
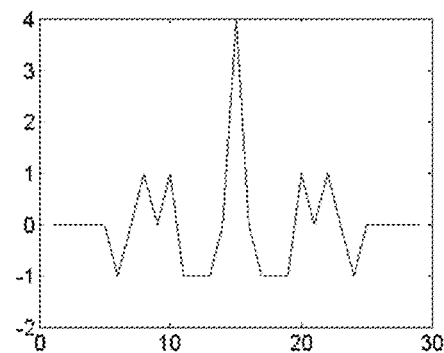
FIG. 1B shows an autocorrelation of the sequence v2 shown in FIG. 1A.
Figure 1C:
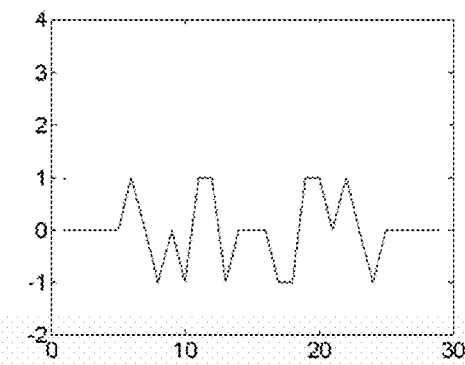
FIG. 1C shows a cross-correlation of the NRI code v2 with other codes v1, v3, or v4 (having the same intervals and v2 but with different non-zero bits, selected from different rows of the 4×4 Hadamard matrix) has outputs bounded by a magnitude of 1 for all lags.
Figure 1D:
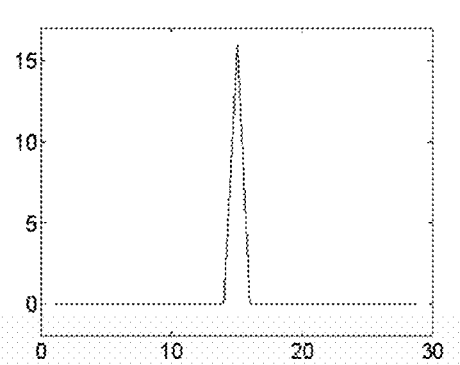
FIG. 1D shows the sum of the autocorrelations of all sequences v1 through v4 yields an ideal delta function

FIG. 1B shows an autocorrelation of the sequence v2 shown in FIG. 1A. The horizontal axis in FIG. 1B shows the lag but is displaced from the actual value; the central spike in FIG. 1B is at a lag of 0. All values of the autocorrelation other than at lag of 0 have magnitude bounded by 1. FIGS. 1C and 1D also show lag on the horizontal axis and have the same displacement of the horizontal axis.

FIG. 1C shows a cross-correlation of the NRI code v2 with code v3, also from the table of 4×4 Hadamard NRI codes. All the codes v1, v2, v3 and v4 have the same intervals and v2 but with different non-zero bits, selected from different rows of the 4×4 Hadamard matrix. The cross-correlation of any two different codes from such a set of codes has outputs bounded by a magnitude of 1 for all lags, as shown for example for v2 and v3 in FIG. 1C.

FIG. 1D shows the sum of the autocorrelations of all sequences v1 through v4. As can be seen in FIG. 1D, this sum yields an ideal delta function.

Algorithm 1 for Constructing Arbitrary-Length Non-Repeating Interval (NRI) Codes:

We propose an algorithm to begin with a seed-sequence of intervals like S={2,3,4} as used above for a 4-bit NRI code, then add additional aperiodic intervals to append one data bit at a time. To add an additional aperiodic interval n to append a new data bit with n−1 interposed zeros, we must search for an interval with the following properties:

C1. The new interval $n=I_{k+1}$ should not be in the set of pre-existing intervals, n $S_{excl}$, where $S_{excl}=\{I, \{\Sigma_1^i I_k \forall i \in [1, 2, \ldots, K]\}, \{\Sigma_1^k I_{K-k} \forall k \in [1, 2, \ldots, K]\}\}$ and K=|I| is the cardinality or size of the set of intervals, $S=\{I_k, k \in [1, 2, \ldots, K]\}$.

C2. Newly formed intervals (formed when combining the new interval $n=I_{K+1}$ with other pre-existing intervals) should not be in the set of excluded intervals: $n+b \notin S_{excl} \forall b \in B$. where $B=\{\Sigma_1^K I_{K+1-k} \forall k \in [1, K]\}$ is the set of intervals terminating at the right-hand side of the existing sequence.

C3. The newly added interval should be of minimum possible length for maximum compactness but this is not essential. We then add the new interval to the ordered set of NRI intervals S and update the sets $S_{excl}$ and B.

The algorithm for generating a NRI pattern S is thus as follows:

(1) begin with a seed-sequence of intervals like S={2,3,4}
(2) Search for a new interval that satisfies the criteria C1-C3 above.
(3) We then add the new interval to the ordered set of NRI intervals S and update the sets $S_{excl}$ and B.
(4) Iterate the above steps until the ordered set S is of the desired length. For Hadamard NRI codes it should be a length for which there exists a Hadamard Matrix.

In the case of the 4-bit NRI code in the example above $S_{excl}=\{2,3,4,5,7,9\}$ and B={4,7,9}. In this case the next interval that meets the above conditions is 6. Once the new data bit is added, additional bits can be added using the same procedure.

We create NRI sequences by creating a vector of non-zero bit separated by zeros where the intervals between non-zero bits is created by the above algorithm.

To create a set of Hadamard encoded NRI sequences we populate the non-zero bits with rows or columns of a Hadamard Matrix. In this case all the sequences in the set contain the same pattern of zeros but the non-zero bits take on different values.

Algorithm 2: Creation of Sets of NRI Sequences with Differing Interval-Patterns.

Given the set of M vectors $s = \{s^{(m)}, m=1, 2, \ldots, M\}$ with $s^{(m)}=[s_1^{(m)} s_2^{(m)} \ldots s_K^{(m)}]$ being vectors corresponding to K intervals in a NRI sequence (with $s_k^{(m)} \in \{1, 2, \ldots\}$) we next propose an algorithm to create a new NRI sequence $q=s_{M+1}$ which has a different interval pattern than those in s but such that the cross-correlation between q and any $s^{(m)} \in s$ is bounded by unity magnitude for all lags and non-zero lag autocorrelation values bounded by unity magnitude.

We begin with existing NRI interval-sequences s then seek a different interval sequence q of the same (or different) length. The existing interval sequences in s have associated with them a set of excluded intervals $s_{excl}$ consisting of all possible intervals formed from $s$. To choose $q_1$, the first element of q, we can either pick an element of $s_{excl}$ or a positive integer which is not in $s_{excl}$. To choose the next element(s) of q we choose a positive integer w with the following properties:

C4. The new interval $w=q_{k+1}$ should be such that $w \notin Q_{excl}$ where $Q_{excl}=\{\{q_i, \forall i \in [1, 2, \ldots, K]\}, \{\Sigma_1^i Q_k, \forall i \in [1, 2, \ldots, K]\}, \{\Sigma_1^k Q_{K-k} \forall k \in [1, 2, \ldots, K]\}\}$ and K is the length of q. This is a restatement of C1 above but for the new NRI pattern.

C5. Newly formed intervals (formed when combining the new interval $w=Q_{K+1}$ with other pre-existing intervals) should not be in the set of excluded intervals: $w+d \notin Q_{excl} \forall d \in D$ where $D=\{\Sigma_1^k Q_{K+1-k} \forall k \in [1, K]\}$ is the set of intervals terminating at the right-hand side of the existing sequence. This is a restatement of C1 above but for the new NRI pattern. C4 and C5 together ensure that the new sequence q will be a NRI vector. Let's say we've generated a sub-vector $[q_1 q_2 \ldots q_K]$ of length K. Call this $q_K$.

C6. Now it could be that existing intervals in the vector $q_K$ have some intervals from the excluded set $s_{excl}$. In this case it is important that the newly added interval $q_{k+1}=w$ not present a situation where non-zero bits of the codes could align at more than one position for any given lag. This could occur only if some interval $\delta_1$ terminating at $q_j$ is a member of $s_{excl}$ AND the newly added interval $w=q_{k+1}$ forms an interval $\delta_2 \in s_{excl}$ between $q_{j+1}$ and $q_{k+1}$ AND the interval pair $[\delta_1, \delta_2]$ occur consecutively somewhere in a NRI vector $\in s$. Thus, the newly formed set of possible interval pairs $p_k=\{[\Sigma_{n=i}^{j \leq k} q_n, \Sigma_{n=j+1}^{k+1} q_n], \forall i \in [1, k]\}$ should not be a possible interval pair in the set of possible interval pairs $g=\{[\Sigma_j^i s_i^{(m)}, \Sigma_{i+1}^L s_i^{(m)}] \forall i \in [j, L], \forall j, \forall L, \forall n\}$ from the existing NRI sequences s, otherwise the cross-correlation at a given lag could involve a sum of more than one non-zero terms endangering the unity magnitude bounding requirement. This is a new criterion.

An algorithm to choose $q_{k+1}$ is thus as follows:

Given a new possible test interval, w, as a candidate for $q_{k+1}$ (and assuming that it satisfies criteria C4-C5 above):

(i) We search to see if the addition of new interval w to NRI vector $q_K$ results in any consecutive interval pairs $[\delta_1, \delta_2]$ which are also in existing NRI sequences. If so then we reject the test value and iterate over a possible list of values for $w=q_{k+1}$ until we find one that meets the criteria.

(ii) To search to see if the addition of new interval w to NRI vector $q_K$ results in any consecutive interval pairs $[\delta_1, \delta_2]$ which are also in existing NRI sequences we do the following:

(a) For a given candidate interval w make a set of possible intervals $\Delta_2=\{\delta_2(j)=\Sigma_{n=j+1}^{k+1} q_n \exists \delta_2 \in s_{excl}\}$ assuming that $q_{k+1}=w$. From this set, find indices j for which $\delta_2(j) \in s_{excl}$. If $\Delta_2=\emptyset$ then w is a good choice so set $q_{k+1}=w$ and the iteration to find the k+1th element is complete. If not, go to step (ii)(b).

(b) Given this set of indices j, make a list of possible intervals $\delta_1(i, j) \in s_{excl}$ where $\delta_1(i, j) = \sum_{n=i}^{j \leq k} q_n$. Call this list set $\Delta_1$. If $\Delta_1 = \emptyset$ then w is a good choice so set $q_{k+1} = w$ and the iteration to find the k+1th element is complete. If not, then make a set $p_k$ of possible consecutive interval pairs $p = [\delta_1, \delta_2]$ and go to step (ii)(c).

(c) Look for the possible consecutive intervals $[\delta_1, \delta_2]$ in the existing NRI sequences. To do this, first determine which set $\Delta_1$ or $\Delta_2$ is smaller as this will restrict the search space. Find which vectors in s contain these intervals and note which indices these intervals span. Then make a list of possible neighbouring intervals≤a given size and hence a list of possible consecutive interval pairs. For example, if the set $\Delta_2$ is smaller than $\Delta_1$ then we look for vectors in s which contain right-intervals of length $\delta_2$. Say this is the subset of vectors $s_{\delta 2} = \{s^{(m)}, m=2,3,7\}$. If the set $p_k$ contains pairs $\{p_1 = [\delta_1[1], \delta_2[1]], \ldots, p_P = [\delta_1[P], \delta_2[P]]\}$ then we would look for possible left intervals of size≤max$\{\delta_1[t] \forall t \exists \delta_2[t] = \delta_2\}$ within vectors from $s_{\delta 2}$. (this can help restrict the search space). Thus for a given right interval $\delta_2$ we make a list of possible interval pairs $g_{\delta_2} = \{[\sum_j^i s_i^{(n)}, \sum_{i+1}^L s_i^{(n)} = \delta_2]\}$. Then after searching over all possible values of $\delta_2$ then $g = \{g_{\delta_2} \forall \delta_2\}$. If $p_k \cap g = \emptyset$ then w is a good choice so set $q_{k+1} = w$ and the iteration to find the k+1th element is complete. If $p_k \cap g \neq \emptyset$, then we reject w as a candidate for $q_{k+1}$ and choose a new candidate, beginning again at step (i) to check it's suitability. We iterate until we find a good candidate.

The algorithm for generating the new NRI patterns is thus as follows:

(1) Given an existing set of NRI vectors s (2) Search for a new interval that satisfies the criteria C4-C6 above.

(3) We then add the new interval to the ordered set of NRI intervals Q and update the sets $Q_{excl}$ and D.

(4) Iterate the above steps until the new vector q is of the desired length. For Hadamard NRI codes it should be a length for which there exists a Hadamard Matrix.

We create new NRI sequences based on the ordered set of intervals Q by creating a vector $v_Q$ of non-zero bits separated by zeros where the intervals between non-zero bits are taken in sequence from the ordered set Q.

A set of new Hadamard NRI codes based on Q can be created by populating the N non-zero bits in $v_Q$ with elements from the rows or columns of an N×N Hadamard matrix.

Thus from M different NRI patterns we can create a set of MN codes which are nearly 'orthogonal' in the sense that they have cross-correlations bounded by unity magnitude for all lags and non-zero lag autocorrelation values bounded by unity magnitude.

We claim that the above algorithms can be modified to accomplish a similar purpose. Also—there may be modifications in the way new bits are selected.

TABLE 1

Example Non-Repeating Intervals for Various Code-Lengths:

| N | Non-Repeating Intervals |
|---|---|
| $2^2$ | 2, 3, 4 |
| $2^3$ | 2, 3, 4, 6, 8, 11, . . . |

Figure 2A:
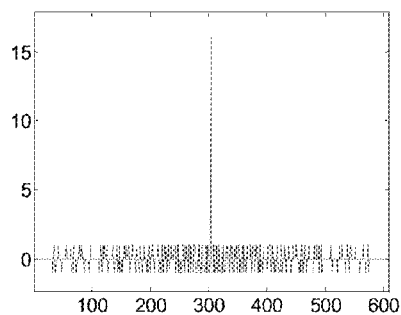
FIG. 2A shows autocorrelation of 16-bit (i.e. 16 non-zero bits) NRI code.
Figure 2B:
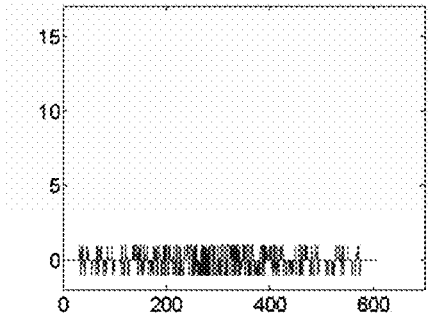
FIG. 2B shows cross correlation of different 16-bit codes.
Figure 2C:
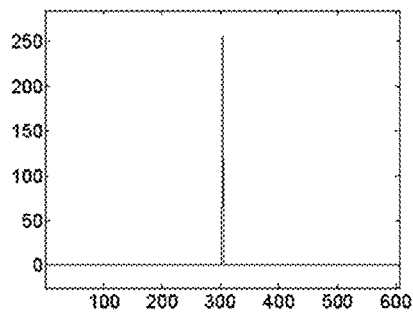
FIG. 2C shows sum of autocorrelations from the complete set of 16-bit codes.
Figure 2D:
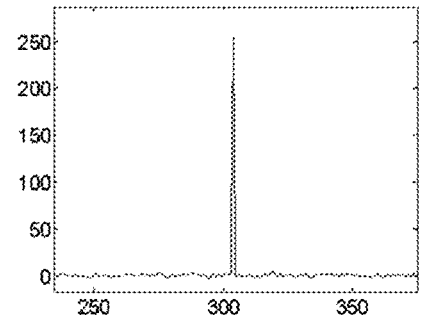
FIG. 2D shows the same as FIG. 2C except noise was added with SNR of 10 (Resulting SNR is ~160 rather than 40 which would be the case without the use of NRI codes)

FIGS. 2A-2D illustrate properties of example 16-bit (i.e. 16 non-zero bits) NRI codes. The horizontal axis in each of these figures shows the lag but with a displacement. The displacement is the same for all of FIGS. 2A-2D. The horizontal position of the spikes visible in FIG. 2A, FIG. 2C and FIG. 2D is at a position of zero lag.

FIG. 2A shows autocorrelation of an example 16-bit NRI code. As can be seen, there is a large spike (corresponding to zero lag) and all other values have magnitude bounded by 1.

FIG. 2B shows cross correlation of two different 16-bit codes from a set of 16 bit NRI codes. As can be seen, all values have magnitude bounded by 1.

FIG. 2C shows sum of autocorrelations from the complete set of 16-bit codes. As can be seen, the sum is a perfect delta function.

FIG. 2D shows the same as FIG. 2C except noise was added with SNR of 10 (Resulting SNR is ~160 rather than 40 which would be the case without the use of NRI codes).

Figure 3A:
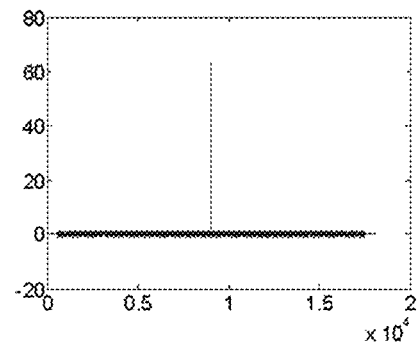
FIG. 3A shows autocorrelation of 64-bit aperiodic orthogonal code.
Figure 3B:
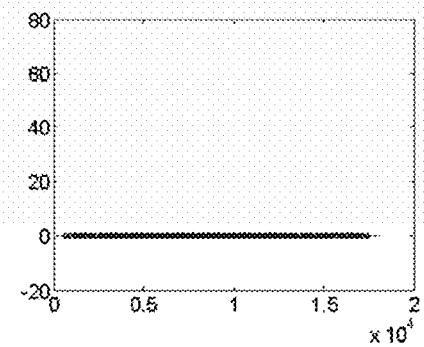
FIG. 3B shows cross correlation of different 64-bit codes
Figure 3C:
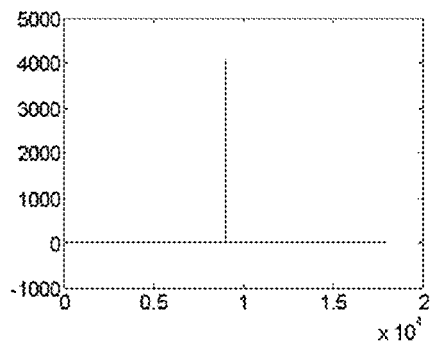
FIG. 3C shows sum of autocorrelations from the complete set of 64-bit codes.
Figure 3D:
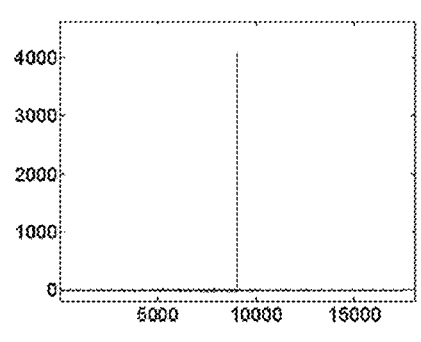
FIG. 3D shows same as FIG. 3C except noise was added with SNR of 10 (Resulting SNR is ~773 rather than 80 which would be the case without the use of aperiodic orthogonal codes)

FIGS. 3A-3D illustrate properties of example 64-bit aperiodic orthogonal codes. The horizontal axis in each of these figures shows the lag but with a displacement. The displacement is the same for all of FIGS. 3A-3D. The horizontal position of the spikes visible in FIG. 3A, FIG. 3C and FIG. 3D is at a position of zero lag.

FIG. 3A shows autocorrelation of an example 64-bit aperiodic orthogonal code. A spike is visible at a position of 0 lag. All other values have magnitude bounded by a much lower value.

FIG. 3B shows cross correlation of two different 64-bit codes from an example set of 64 bit codes. The magnitudes of the cross correlations are bounded at a low value.

FIG. 3C shows sum of autocorrelations from the complete set of 64-bit codes. The sum is a perfect delta function or visually indistinguishable from a perfect delta function in this graph.

FIG. 3D shows same as FIG. 3C except noise was added with SNR of 10 (Resulting SNR is ~773 rather than 80 which would be the case without the use of aperiodic orthogonal codes);

Application I: Enhancing Simple Pulse-Echo Measurement SNR

To perform pulse-echo imaging with high SNR we could perform a number of pulse echo measurements and average. But this could take a long time since you need to wait an entire pulse-echo time interval for each measurement. Alternatively we propose transmitting a sequence of NRI codes and performing a comparing algorithm such as cross-correlation after each code transmit-receive measurement. After sending the complete set of codes, adding measurements together will result in the equivalent of a delta function transmission with greatly enhanced signal-to-noise, equivalent to requiring M^2 averages but needing only M transmit-receive events for an M-bit sequence. Thus M transmit events can potentially improve the SNR by a factor of M rather than $\sqrt{M}$ as is typically the case for averaged measurements.

Application II: Multi-User Communications

Our NRI codes may have applications in Asynchronous Code-Division-Multiple Access (CDMA) for multi-user communications. Given multiple transmitters and multiple receivers it is possible to send coded messages from all transmitters simultaneously (or with arbitrary delays) and receive signals on all receivers then each receiver may perform decoding by cross-correlation with the key sequences (in this case the key sequences may be the NRI-codes) to decouple which signal came from which transmitter. The coded message may be constructed by correlating or convolving an NRI code with a message signal. When decoding takes place via applying a comparing algorithm such as correlation with a given NRI sequence the output will be close to a delta function convolved with the message, which is an approximation of the original message. The NRI-codes may offer some advantages over random-noise codes since correlation sidelobes are bounded to magnitudes of 1 for NRI codes, unlike random-noise codes, while correlation mainlobe increases with non-zero-bit code-length.

Note that it is possible to design NRI code intervals so that all possible autocorrelations have P zero-values on either side of the mainlobes (the autocorrelation has value zero for delays of 1 to P+1 and from −1 to −P−1). In this way convolution or correlation with the message signal of length P will be minimally contaminated.

Application III: Simultaneous Synthetic Aperture Imaging

The following discussion will be focused on synthetic aperture ultrasound imaging, however, similar principles will apply to other types of multi-transmitter multi-receiver imaging including sonar, air-coupled ultrasonics, radar (including synthetic aperture radar) etc.

By transmitting different NRI codes from different elements/transmitters of a transducer simultaneously (or asynchronously) and receiving with a multiplicity of receivers (which may or may not be the same elements as the transmitters) it will be possible to decode for each possible transmitter signal on each receiver to reconstruct the effective full (or partial) synthetic aperture data set consisting of signals associated with each transmitter-receiver pair. This data can then be subjected to synthetic aperture beamforming. Traditional synthetic aperture imaging typically requires transmitting a pulse/signal from each transmitter one at a time and receiving on all receiver elements simultaneously. This requires significant time-delays to permit for propagation of signals over multiple transmission events and such time delays may be unacceptable due to motion or decorrelation of signals. In contrast the NRI approach enables simultaneous transmission of codes such that for a single transmit event (involving parallel transmission of multiple codes) an effectively complete synthetic aperture dataset may be collected.

Application IV: Parallel Walking Aperture Imaging.

Traditional imaging transmits a focused beam along a line-of sight (LOS) then listens to the echoes along that same line, then the procedure is repeated along a sequence of LOSs to form an image. This is frame-rate limited by the time-of-flight of ultrasound. We propose transmitting focused beams along multiple LOSs in parallel rather than sequentially using a different NRI code for each LOS. Data is collected from all elements in parallel then a comparing algorithm such as cross correlation is applied with the NRI-code key for each LOS to decouple data from other LOSs.

Simulating Imaging System Performance:

a. Field II is used to simulate the performance of the NRI synthetic aperture algorithm. Field II is an ultrasound simulation software that uses the Tupholme-Stepanishen method to calculate pulsed ultrasound fields.

b. The tests are performed using a 5 MHz center frequency linear array transducer. The transducer has 64 elements, with a kerf of 7.7 microns. Each element has a width of 146 microns, and a height of 10 mm. The whole array has an aperture of 0.94 cm. All simulations were performed with a sampling frequency of 150 MHz.

c. To characterize the performance, two different phantoms are simulated, as well as a single point scatterer. The single point scatterer is simulated in order to obtain the point-spread-function of the algorithm, and quantify its SNR. The first phantom consisted of 5 cyst regions to characterize the contrast-to-noise ratio and evaluate the contrast-lesion detection ability of the algorithm. The second phantom consisted of 5 highly scattering regions in order to evaluate the CNR as well. Each phantom contained 100,000 scatterers. The scatterers are first randomly assigned a Gaussian distributed amplitude. If a scatterer resides in a cyst region, then its amplitude is set to 0. If a scatterer resides in a high scattering region, then its amplitude is set to 10 times the Gaussian distributed amplitude it was previously assigned. The scatterers and phantoms may be seen in the provisional application from which priority is claimed.

d. The phantoms are simulated using a synthetic aperture algorithm, an NRI synthetic aperture algorithm, and a flash imaging algorithm. Noise is added to the scattering data on receive to make the resultant image have an SNR of 20 dB.

e. The CNR was calculated using the following formula for each of the five targets in order to quantify the contrast-legion detection capability of each algorithm.

$$CNR = \frac{S_{in} - S_{bg}}{sqrt(\sigma_{in}^2 - \sigma_{bg}^2)},$$

where $S_{in}$ is the mean signal in the target, $S_{bg}$ is the mean signal in the background, and $\sigma_{in}$ and $\sigma_{bg}$ are the standard deviations inside the target and for the background respectively.

The following table summarizes the SNR and contrast-legion detection capabilities of all three algorithms.

TABLE 1

SNR and CNR for Flash Imaging, SA Imaging, and NRI-SA Imaging

|  | SNR (dB) | CNR for 5 Cysts (top to bottom) | CNR for 5 High Scattering Regions (top to bottom) |
| --- | --- | --- | --- |
| Flash Imaging | 19.9 | −0.3939 | 1.5104 |
|  |  | 0.1590 | 1.3015 |
|  |  | −0.1865 | 1.0035 |
|  |  | 0.7121 | 1.6584 |
|  |  | N/A (Invisible) | 1.2428 |
| SA Imaging (64 Transmit Events) | 27.5 | −1.4034 | 0.8529 |
|  |  | −1.3565 | 1.1856 |
|  |  | −1.3491 | 1.5096 |

TABLE 1-continued

SNR and CNR for Flash Imaging,
SA Imaging, and NRI-SA Imaging

| | SNR (dB) | CNR for 5 Cysts (top to bottom) | CNR for 5 High Scattering Regions (top to bottom) |
|---|---|---|---|
| NRI-SA Imaging (1 Transmit Event) | 20.2 | −1.2882<br>N/A (Invisible)<br>−1.2924<br>−1.2543<br>−1.2531<br>−1.0946<br>N/A (Invisible) | 1.4729<br>1.2551<br>1.0553<br>1.2535<br>1.2929<br>1.3983<br>1.2179 |

The results above show that Flash imaging has the worst and most erratic contrast-legion detection capabilities, while Synthetic Aperture imaging and NRI-SA imaging have almost the same CNR. Synthetic Aperture has a better SNR than all three imaging algorithms, except it takes the longest to perform. NRI-SA sacrifices a little SNR in order to provide optimal images close to SA, but with an n-times reduction in time, where n is the number of elements used in transmit. In this case, 64 elements were used in transmit, and Synthetic Aperture takes 64 times longer to perform than NRI-SA.

Possible System Embodiments

Ultrasound System Embodiment

An embodiment of an imaging system to implement the Non-repeating interval coding methods discussed above is shown in FIGS. 4A, 4B, 4C and 4D. The imaging system may be an ultrasound imaging system, sonar imaging system, radar system for example. An embodiment of a communication system using the disclosed coding is shown in FIGS. 5A, 5B and 5C.

Figure 4A:
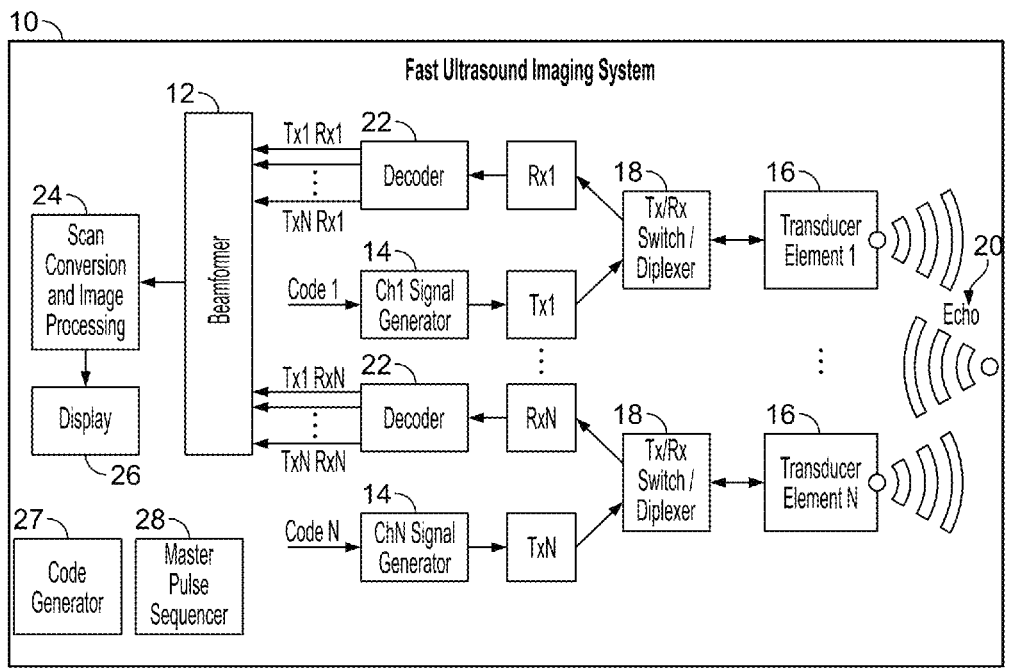
FIG. 4A is a block diagram of system architecture for a fast ultrasound system using Non-repeating interval codes n=1, 2, . . . , N. A different code is transmitted for each element and all elements are used to receive signals (a similar architecture may be used for a sonar or radar system), where Rx is a receiver and Tx is a transmitter.
Figure 5A:
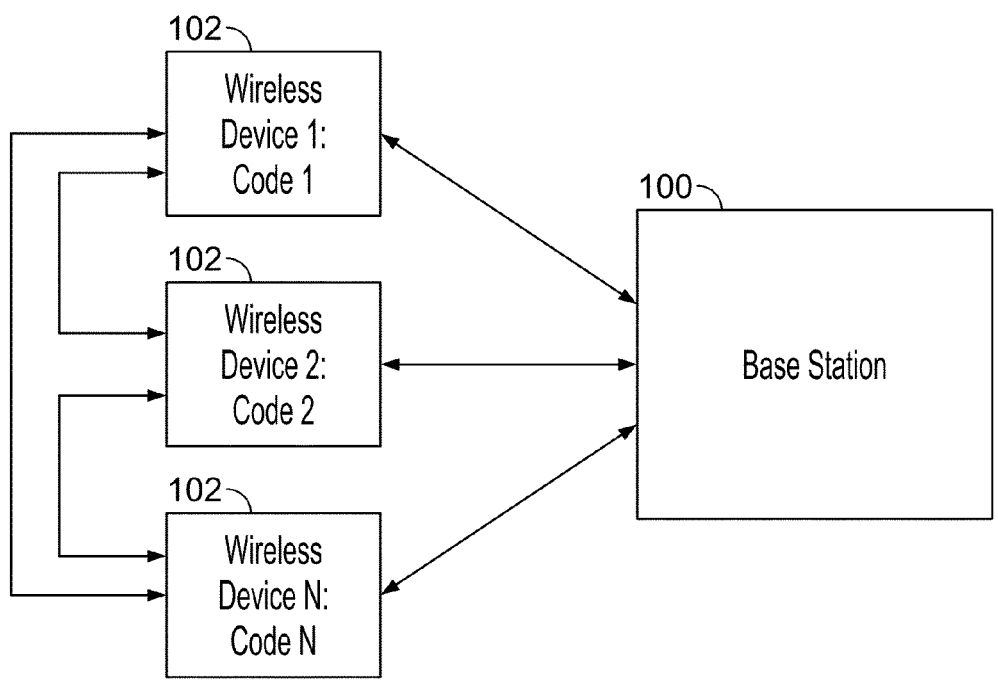
FIG. 5A shows an exemplary wireless network using NRI codes.
Figure 5B:
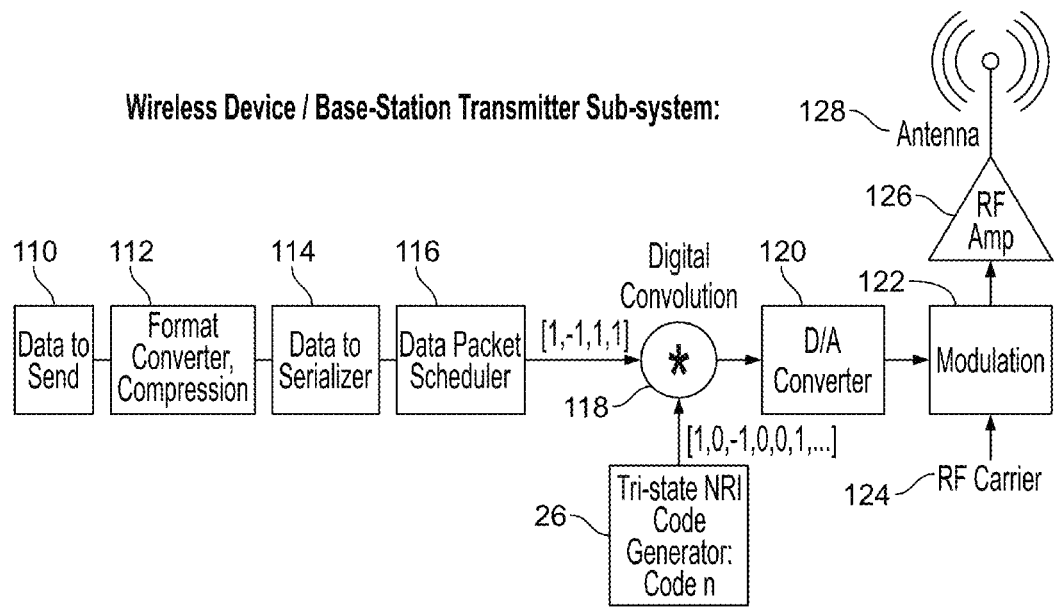
FIG. 5B shows a transmitter sub-system architecture using NRI codes.
Figure 5C:
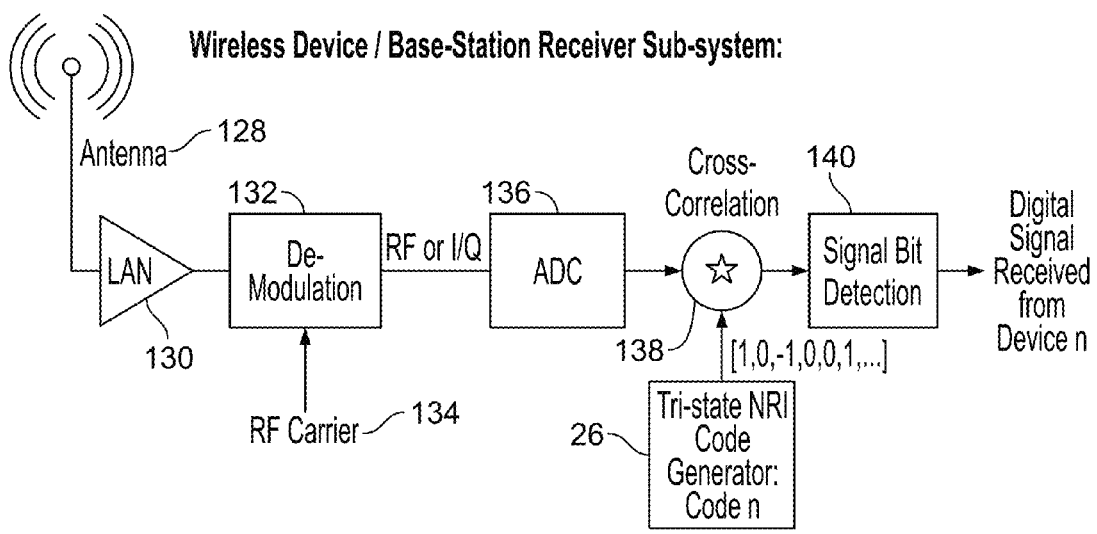
FIG. 5C shows an exemplary receiver architecture using NRI codes.

As shown in FIG. 4A, a fast ultrasound imaging system 10 comprises N branches or channels. Each branch of the N branches includes a signal generator 14 that receives one of the disclosed codes, here designated codes 1 . . . N and drives a corresponding transmitter Tx1 . . . TxN. Each transmitter TX1 . . . TxN drives a corresponding transducer element 16 through a corresponding transmit/receive switch or duplexer 18. The transducer elements receive echo 20 and send the received signal via switch/duplexer 18 to corresponding receivers Rx1 . . . RxN. The output of the receivers is decoded at corresponding decoders 22 which output a comparison of each transmitted code with the respective received signal. The output of the decoders is processed by a beamformer 12 to determine spatial information which is further processed by a scan conversion and image processing element 24 to provide an image for display on display 26. A code generator 27 may generate codes 1 . . . N in advance of the operation of the fast ultrasound imaging system 10. There is also a master pulse sequencer 28.

Figure 4B:
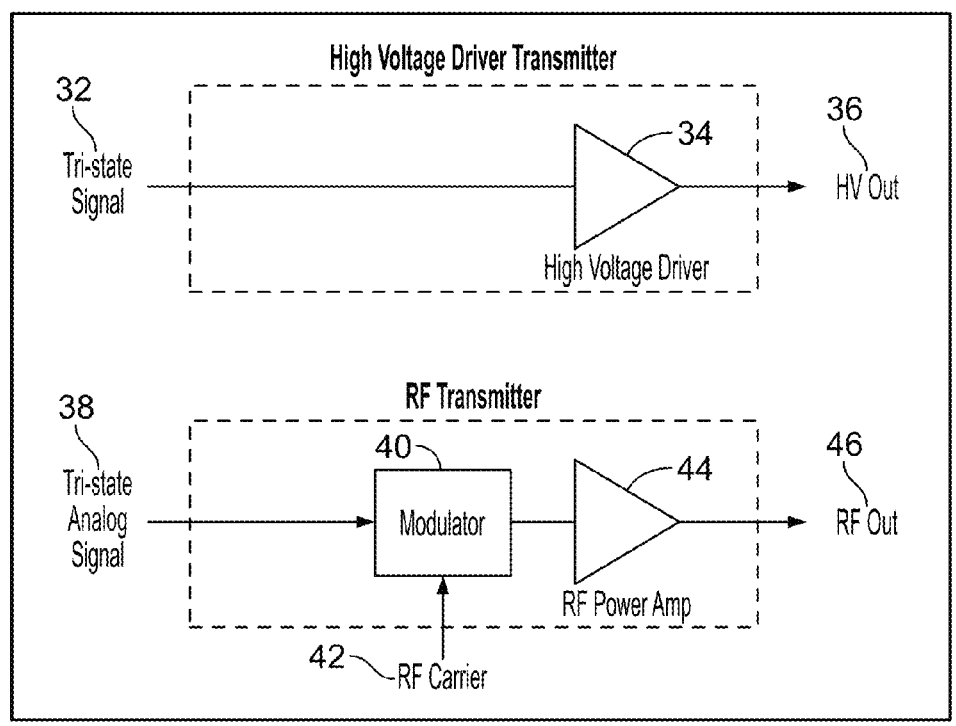
FIG. 4B shows an exemplary transmitter architecture; the transmitters may be virtual transmitters, each virtual transmitter being realized by using a multiplicity of elements to focus at a location, to become the virtual transmitter location.

FIG. 4B shows two embodiments of exemplary transmitter architecture; the transmitters may be virtual transmitters, each virtual transmitter being realized by using a multiplicity of elements to focus at a location, to become the virtual transmitter location. In the first embodiment shown, showing a high voltage driver transmitter, a tri-state input signal 32 is provided to a high voltage driver 34 to provide a high voltage output 36. In the second embodiment shown, showing an RF transmitter, a tri-state analog signal 38 is received by modulator 40 which modulates the signal 38 onto RF Carrier 42. An RF power Amp 44 amplifies the modulated signal to provide RF output 46. In the event that non tri-state codes are used, the input signals 32 and 38 would be other than tri-state. A transmitter may comprise a transmitting element and a processing part. A processing part may comprise multiple processing parts. No transmitting element is shown in FIG. 4B but examples are shown in FIG. 4A (transducer elements 16) and FIG. 5B (antenna 128). Any element may comprise a processing part depending on the embodiment, and any element that carries out processing is a processing part. For example, at least elements 110, 112, 114, 118, 120 and 122 of FIG. 5B are processing parts and collectively may be regarded as a processing part.

Figure 4C:
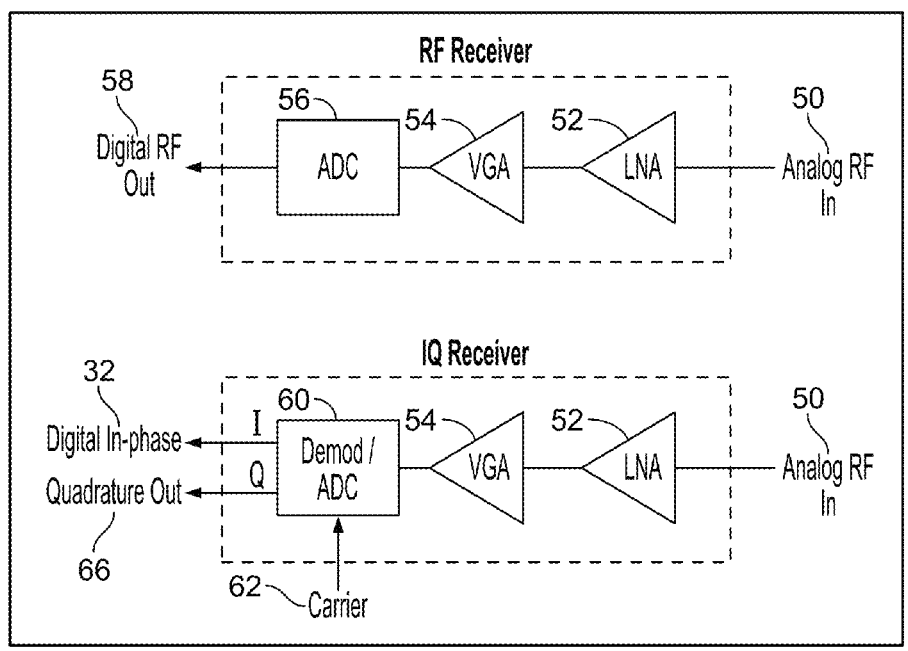
FIG. 4C shows an exemplary receiver architecture.

FIG. 4C shows two embodiments of an exemplary receiver architecture; the receivers may be virtual receivers. In the first embodiment shown, showing an RF receiver, an analog RF input 50 is amplified by low noise amplifier 52, followed by a variable gain amplifier 54 and converted to a digital signal by analog-to-digital converter 56 to provide digital RF out 58. In the second embodiment shown, showing an IQ receiver, an analog RF input 50 is amplified by low noise amplifier 52, followed by a variable gain amplifier 54 and converted to a digital signal and demodulated using analog-to-digital converter and demodulator 60 using a comparison with carrier signal 62 to provide digital in-phase output 64 and digital quadrature output 66. A receiver may comprise a receiving element and a processing part. A processing part may comprise multiple processing parts. No receiving element is shown in FIG. 4C but examples are shown in FIG. 4A (transducer elements 16) and FIG. 5C (antenna 128). Any element may comprise a processing part depending on the embodiment, and any element that carries out processing is a processing part. For example, at least elements 132, 136, 138 and 140 of FIG. 5C are processing parts and collectively may be regarded as a processing part.

Figure 4D:
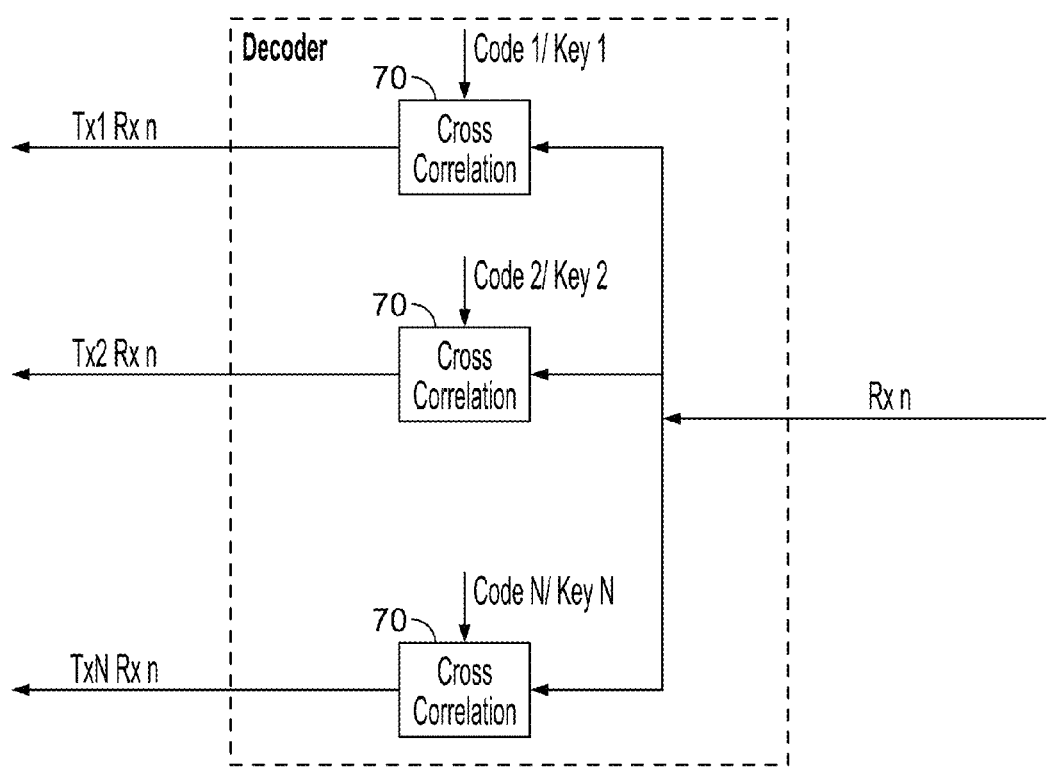
FIG. 4D shows an exemplary decoder architecture (the decoder may be implemented using ASICs, FPGAs or other programmable logic device or using CPUs or GPUs for example)

FIG. 4D shows an exemplary decoder architecture (the decoder may be implemented using ASICs, FPGAs or other programmable logic device or using CPUs or GPUs for example). An input signal Rx n is cross-correlated with each transmitted code or key in respective cross-correlation elements 70 to produce respective outputs Tx1 Rx n . . . TxN Rx n. The cross-correlations may be conducted in parallel as shown or sequentially.

Communication System Embodiment

FIG. 5A shows an exemplary wireless network using NRI codes. A base station 100 communicates with up to N wireless devices 102 each using a respective code of a set of codes. The wireless devices may also communicate with each other as shown. The number of wireless devices can be equal to or fewer than the number of codes of the set of codes; there may also be more wireless devices than codes as long as the number of devices simultaneously active is less than or equal to the number of codes. Other multiplexing methods may also be combined with the system to increase the number of wireless devices that can be simultaneously active.

FIG. 5B shows an exemplary transmitter sub-system architecture using NRI codes. Data 110 is converted and compressed by format converter and compressor 112 and serialized by serializer 114. Data packet Scheduler 116 schedules packets which are convolved with a code from code generator 26 by digital convolution element 118, and then processed by digital-to-analog converter 120 to produce an analog signal that is modulated by modulator 122 onto carrier signal 124. The modulated signal is then amplified by RF amplifier 126 for transmission by antenna 128.

FIG. 5C shows an exemplary receiver sub-system architecture using NRI codes. Antenna 128 receives an incoming signal. The signal is amplified using low noise amplifier 130. Demodulator 132 demodulates the signal using RF carrier 134. The output of the demodulator, which may be an RF output or I/Q output, Is converted to a digital signal by analog-to-digital converter 136. The digital signal is cross-correlated with a code or codes from code generator 26 by cross-correlation element 138. A signal bit detection element 140 detects bits in the output of the cross-correlation element to produce a digital signal received from device n.

Implementation Issues:

There is often a dead-zone associated with amplifier saturation-recovery or HV switch transition time. The longer the code length, the longer the dead-zone. Our proposed NRI codes can be quite lengthy. Time-gain compensation techniques normally used in ultrasound imaging and other techniques may not be applicable because the NRI approach involve transmitting bits at multiple time points over the course of the code transmission. If time-gain compensation cannot be easily used the dynamic range of digitizers may need to be large compared to more traditional instruments.

Loosening Minimum sidelobe Constraints:

We disclose modifications of our algorithm to create NRI sequences to permit sidelobe magnitudes of given bounded height by permitting re-use of intervals.

Correlation-Free Windows:

We disclose modification of our algorithm to ensure zero-correlation windows on either side of the mainlobe ensuring length P of zeros.

Generalization to Multi-State/Multi-Phase Aperiodic Codes:

We disclose generalization of the NRI codes to populate non-zero bits with values other than from Hadamard sequences and values different than 1 or −1 (which could include any real or complex numbers or characters).

Code-Sets with Different Intervals.

In the previous examples we discussed a set of N codes where the intervals were identical but non-zero bits could take different values (and in particular were selected from Hadamard Sequences). Here we also claim the use of sets of codes which may not necessarily use the same intervals between codes or where the intervals may be re-ordered.

APPENDIX

Our present MATLAB algorithms for generating NRI codes (to be included).

Linear Least Squares Estimation of Effective Synthetic Aperture Data for a Given Pulse Sequence We describe a framework for linear least-squares estimation of synthetic aperture data for a given pulse sequence which can involve temporal and spatial (aperture) coding.

Let $e_{kj}(t)$ be the pulse-echo signal due to delta-function transmit event on element j and receiving on element k. Let $c_l^{(i)}(t)$ represent code l fired during transmit event (i). Then the pulse-echo signal due to firing code l from element j and receiving on element k during the ith transmit event is given as:

$$v_{kj}^{(i)}(t) = c_l^{(i)}(t) * e_{kj}(t)$$

We can transmit all codes in parallel during transmit event (i). In this case the pulse-echo signal due to transmitting all codes in parallel (with a given code-mapping) and receiving on element k is given as:

$$p_k^{(i)}(t) = \sum_j \sum_l M_{jl}^{(i)} c_l^{(i)}(t) * e_{kj}(t)$$

Here $M_{jl}^{(i)}$ is a code-mapping matrix which assigns code l to element j for transmit event (i) with a 1-1 mapping. We refer to $c_j^{(i)} = \Sum_l M_{jl}^{(i)} c_l^{(i)}(t)$ as the code transmitted from element j during transmit event (i).

In matrix notation $c_j^{(i)}(t) * e_{kj}(t)$ is written as:

$$v_{kj}^{(i)} = C_j^{(i)} e_{kj}$$

Where $v_{kj}^{(i)} = [v_{kj}^{(i)}(t_1) v_{kj}^{(i)}(t_2) \ldots v_{kj}^{(i)}(t_\tau)]^T$ is a $\tau \times 1$ column vector, $e_{kj} = [e_{kj}(t_1) e_{kj}(t_2) \ldots e_{kj}(t_T)]^T$ is a $T \times 1$ column vector, and $C_j^{(i)}$ is a $\tau \times T$ Toeplitz matrix:

$$C_j^{(i)} = \begin{bmatrix} c_j^{(i)}(t_1) & 0 & 0 & \ldots & 0 \\ c_j^{(i)}(t_1) & c_j^{(i)}(t_1) & & & 0 \\ \vdots & & & & 0 \\ c_j^{(i)}(t_T) & c_j^{(i)}(t_{T-1}) & \ldots & & c_j^{(i)}(t_1) \\ 0 & c_j^{(i)}(t_T) & \ldots & & c_j^{(i)}(t_2) \\ 0 & 0 & & & \vdots \\ 0 & 0 & \ldots & & c_j^{(i)}(t_T) \end{bmatrix}$$

Here $\tau = 2T - 1$. When sufficient padding is used to avoid wraparound error, the Toeplitz matrix can be replaced by a $\tau \times \tau$ circulant Matrix, and T and $\tau$ can be taken as the same length, which will simplify downstream computations.

The set of pulse echo measurements involving transmitting on all elements with different codes and receiving on element k can be written in matrix notation as:

$$\begin{bmatrix} v_{k1}^{(i)} \\ v_{k2}^{(i)} \\ \vdots \\ v_{kJ}^{(i)} \end{bmatrix} = \begin{bmatrix} C_1^{(i)} & \ldots & 0 \\ \vdots & \ddots & \vdots \\ 0 & \ldots & C_J^{(i)} \end{bmatrix} \begin{bmatrix} e_{k1} \\ e_{k2} \\ \vdots \\ e_{kJ} \end{bmatrix}$$

Where the LHS $\tau J \times 1$ column vector can be named $v_k^{(i)}$, the $\tau J \times TJ$ block-diagnonal block Toeplitz matrix, which we denote as $C^{(i)}$ can be taken as a $\tau J \times \tau J$ block circulant with sufficient zero-padding, and the RHS $\tau J \times 1$ column vector can be denoted as $e_k$.

The collection of all transmit-receive data from transmit event (i) can thus be written as $$\begin{bmatrix} v_{11}^{(i)} & v_{21}^{(i)} & \ldots & v_{K1}^{(i)} \\ v_{12}^{(i)} & v_{22}^{(i)} & \ldots & v_{K2}^{(i)} \\ \vdots & & & \\ v_{1J}^{(i)} & v_{2J}^{(i)} & \ldots & v_{KJ}^{(i)} \end{bmatrix} = \begin{bmatrix} C_1^{(i)} & \ldots & 0 \\ \vdots & \ddots & \vdots \\ 0 & \ldots & C_J^{(i)} \end{bmatrix} \begin{bmatrix} e_{11} & e_{21} & \ldots & e_{K1} \\ e_{12} & e_{22} & \ldots & e_{K2} \\ \vdots & & & \\ e_{1J} & e_{2J} & \ldots & e_{KJ} \end{bmatrix}$$

The LHS $\tau J \times K$ matrix can be denoted as $[v^{(i)}]^T$ and the RHS $\tau J \times K$ matrix can be denoted as e.

If we transmit on all element simultaneously with apodization $w_{cp}^{(i)} = [w_1^{(i)} w_2^{(i)} \ldots w_J^{(i)}]$ during transmit event (i) the receive data is modelled as:

$$[p^{(i)}]^T = [w_1^{(i)} I_{\tau \times \tau} \; w_2^{(i)} I_{\tau \times \tau} \; \ldots \; w_J^{(i)} I_{\tau \times \tau}][v^{(i)}]^T$$

Or $$p^{(i)} = v^{(i)} W^{(i)} = e^T [C^{(i)}]^T W^{(i)},$$

where $W^{(i)} = \begin{bmatrix} w_1^{(i)} I_{\tau \times \tau} \\ w_2^{(i)} I_{\tau \times \tau} \\ \vdots \\ w_J^{(i)} I_{\tau \times \tau} \end{bmatrix}$ is $\tau J \times \tau$ and $p^{(i)}$ is $K \times \tau$.

The matrix representing measured data for all transmit events and all receive elements is thus $$P^T = [p^{(1)} \; p^{(2)} \; \ldots \; p^{(i)}] = e^T \left[[C^{(1)}]^T W^{(1)} \; \ldots \; [C^{(i)}]^T W^{(i)}\right] =$$

$$e^T [[C^{(1)}]^T \; \ldots \; [C^{(i)}]^T] \begin{bmatrix} W^{(1)} & \cdots & \\ \vdots & \ddots & \vdots \\ & \cdots & W^{(i)} \end{bmatrix}$$

And we denote $$W^T = \begin{bmatrix} W^{(1)} & \cdots & \\ \vdots & \ddots & \vdots \\ & \cdots & W^{(i)} \end{bmatrix}$$

(which is $J\tau i \times \tau i$ and block diagonal) and $C^T = [[C^{(1)}]^T \; \ldots \; [C^{(i)}]^T]$ (which is of size $J\tau \times J\tau i$).
Thus $$P = WCe + n$$

Where n is an $\tau i \times K$ additive noise matrix. For notational simplicity we can denote $A = WC$ so that $$P = Ae + n$$

The task is to choose codes and apodizations and reconstruction algorithms to give best possible estimate of the synthetic aperture data e. We want a linear unbiased estimate:

$$\hat{e} = QP$$

So that errors are minimized. The linear least squares estimate of Q is $$Q = (A^T A)^{-1} A^T = (C^T W^T W C)^{-1} C^T W^T$$

Errors can be written as the ensemble mean $\langle \epsilon_j \rangle = \langle (\hat{e}_j - e_j)(\hat{e}_j - e_j)^T \rangle$. With white noise $\langle n^T n \rangle = \sigma^2 I$ it has been shown that one must choose A to minimize $$\frac{\epsilon}{\sigma^2} = Tr[A^{-1}(A^{-1})^T]$$

And we want the condition number of A to be as low as possible.

Fourier Domain Analysis:
$C_j^{(i)}$ is a $\tau \times \tau$ block circulant matrix hence can be diagonalized via a DFT:

$$C_j^{(i)} = \tilde{U} F_j^{(i)} \tilde{U}^*$$

Where $\tilde{U}$ is a $\tau \times \tau$ unitary DFT matrix with elements $$[\tilde{U}]_{\alpha\beta} = \exp\left(j \frac{2\pi}{T} \alpha\beta\right),$$

and $F_j^{(i)}$ is a $\tau \times \tau$ diagonal matrix with diagonal elements representing the DFT of the code transmitted on element j during the ith transmit event: $F_j^{(i)} = \text{diag}(\text{DFT}(c_j^{(i)}(t)))$.

The matrix $C^{(i)}$ is a $\tau J \times \tau J$ block-diagonal block-circulant matrix and is thus also diagonalizable:

$$C^{(i)} = \begin{bmatrix} \tilde{U} & \cdots & \\ \vdots & \ddots & \vdots \\ & \cdots & \tilde{U} \end{bmatrix} \begin{bmatrix} F_1^{(i)} & \cdots & 0 \\ \vdots & \ddots & \vdots \\ 0 & \cdots & F_J^{(i)} \end{bmatrix} \begin{bmatrix} \tilde{U}^* & \cdots & 0 \\ \vdots & \ddots & \vdots \\ 0 & \cdots & \tilde{U}^* \end{bmatrix} = \breve{U} F^{(i)} \breve{U}^*$$

all matrices here are of size $\tau J \times \tau J$. Thus $$C = \begin{bmatrix} \breve{U} F^{(1)} \breve{U}^* \\ \breve{U} F^{(2)} \breve{U}^* \\ \vdots \\ \breve{U} F^{(i)} \breve{U}^* \end{bmatrix} = \begin{bmatrix} \breve{U} & \cdots & 0 \\ \vdots & \ddots & \vdots \\ 0 & \cdots & \breve{U} \end{bmatrix} \begin{bmatrix} F^{(1)} \\ F^{(2)} \\ \vdots \\ F^{(i)} \end{bmatrix} \breve{U}^* = UF\breve{U}^*$$

Here C is of size $J\tau i \times J\tau$, U is $J\tau i \times J\tau i$, and F is $J\tau i \times J\tau$.

Fourier-Domain Estimation of Effective Synthetic Aperture Data:

The algorithm to recover the minimum mean square error unbiased estimate of the synthetic aperture data is $$\hat{e} = (A^T A)^{-1} A^T P$$

The Moore-Penrose Pseudo-inverse can be computed analytically using DFT simplifications to give the recovery algorithm in the Fourier Domain as:

$$\hat{e}_{kj}(t) = IDFT \left\{ \sum_{(i)} w_j^{(i)} \tilde{P}_k^{(i)}(\omega) \frac{\tilde{C}_j^{*(i)}(\omega)}{\Sigma_i S_j^{(i)}(\omega)} \right\}$$

Here $\hat{e}_{kj}(t)$ is the effective synthetic aperture data due to transmitting on element j and receiving on element k. $\tilde{P}_k^{(i)}(\omega)$ is the temporal Fourier transform of $P_k^{(i)}(t)$, the measured data on receive element k as a function of time during the ith transmit event. $S_j^{(i)}(\omega)$ is the power spectral density of code $c_j^{(i)}(t)$
Transmitted on element j during the ith transmit event, and $\tilde{C}_j^{*(i)}(\omega)$ is the complex conjugate of the Fourier transform of $c_j^{(i)}(t)$. Multiplication of the data by $\tilde{C}_j^{*(i)}(\omega)$ in the Fourier domain represents correlation in the time-domain. This is regularized by the total power-spectral density over all transmit events. The derivation assumes that equal numbers of element are used for each transmit event.

Derivation of the Algorithm:
The Moore-Penrose Pseudo-inverse is $$A^+ = (A^T A)^{-1} A^T$$

This can be written as $$A^+ = (C^T W^T W C)^{-1} C^T W^T$$

Now $$W^T W = \begin{bmatrix} [W^{(1)}]^T W^{(1)} & \cdots & 0 \\ \vdots & \ddots & \vdots \\ 0 & \cdots & [W^{(i)}]^T W^{(i)} \end{bmatrix}$$

Is block diagonal with $$[W^{(i)}]^T W^{(i)} = [w_1^{(i)} I \; w_2^{(i)} I \; \cdots \; w_J^{(i)} I] \begin{bmatrix} w_1^{(i)} I \\ w_2^{(i)} I \\ \vdots \\ w_J^{(i)} I \end{bmatrix} = \lambda^{(i)} I$$

With $$\lambda^{(i)} = \sum_j [w_j^{(i)}]^2$$

So $$W^T W = \begin{bmatrix} \lambda^{(i)} I & \cdots & 0 \\ \vdots & \ddots & \vdots \\ 0 & \cdots & \lambda^{(i)} I \end{bmatrix} = \Lambda$$

Note that $\Lambda = \lambda I$ if $\lambda^{(i)} = \lambda \, \forall i$. With this condition $$(C^T W^T W C)^{-1} = (\check{U} F^* U^* \Lambda U F \check{U}^*)^{-1} = \lambda^{-1} (\check{U} F^* F \check{U}^*)^{-1}$$

Now $$F^* F = |F|^2 = |F^{(1)}|^2 + |F^{(2)}|^2 + \cdots + |F^{(i)}|^2 =$$

$$\begin{bmatrix} \text{diag}(\Sigma_{i'} S_1^{(i')}(\omega)) & \cdots & 0 \\ \vdots & \ddots & \vdots \\ 0 & \cdots & \text{diag}(\Sigma_{i'} S_J^{(i')}(\omega)) \end{bmatrix}$$

Here $S_1^{(i)}(\omega)$ is the power spectral density of code $c_j^{(i)}(t)$ transmitted on element j during the ith transmit event and $$\text{diag}\left(\sum_{i'} S_1^{(i')}(\omega)\right) = \begin{bmatrix} \sum_{i'} S_1^{(i')}(\omega_1) & \cdots & \\ \vdots & \ddots & \vdots \\ & \cdots & \sum_{i'} S_1^{(i')}(\omega_\tau) \end{bmatrix}.$$

The reconstruction algorithm reduces to:

$$\hat{e} = \lambda^{-1} \check{U} |F|^{-2} F^* U^* W^T P$$

We go through the evaluation of this step by step:

$$W^T P = \begin{bmatrix} \begin{bmatrix} w_1^{(1)} & \cdots & \\ \vdots & \ddots & \vdots \\ & \cdots & w_1^{(1)} \end{bmatrix} & \cdots & 0 \\ \begin{bmatrix} w_J^{(1)} & \cdots & \\ \vdots & \ddots & \vdots \\ & \cdots & w_J^{(1)} \end{bmatrix} & \ddots & \vdots \\ \vdots & \ddots & \vdots \\ 0 & \cdots & \begin{bmatrix} w_1^{(i)} & \cdots & \\ \vdots & \ddots & \vdots \\ & \cdots & w_1^{(i)} \end{bmatrix} \\ & & \begin{bmatrix} w_J^{(i)} & \cdots & \\ \vdots & \ddots & \vdots \\ & \cdots & w_J^{(i)} \end{bmatrix} \end{bmatrix} P$$

Now P is structured as:

$$P = \begin{bmatrix} \begin{bmatrix} P_{k=1}^{(1)}(t_1) \\ \vdots \\ P_{k=1}^{(1)}(t_\tau) \end{bmatrix} & \cdots & \begin{bmatrix} P_{k=K}^{(1)}(t_1) \\ \vdots \\ P_{k=K}^{(1)}(t_\tau) \end{bmatrix} \\ \vdots & \ddots & \vdots \\ \begin{bmatrix} P_{k=1}^{(i)}(t_1) \\ \vdots \\ P_{k=1}^{(i)}(t_\tau) \end{bmatrix} & \cdots & \begin{bmatrix} P_{k=K}^{(i)}(t_1) \\ \vdots \\ P_{k=K}^{(i)}(t_\tau) \end{bmatrix} \end{bmatrix}$$

So $$\check{P} \equiv W^T P = \begin{bmatrix} w_{j=1}^{(1)} \begin{bmatrix} P_{k=1}^{(1)}(t_1) \\ \vdots \\ P_{k=1}^{(1)}(t_\tau) \end{bmatrix} & \cdots & w_{j=1}^{(1)} \begin{bmatrix} P_{k=K}^{(1)}(t_1) \\ \vdots \\ P_{k=K}^{(1)}(t_\tau) \end{bmatrix} \\ \vdots & \ddots & \vdots \\ w_{j=J}^{(1)} \begin{bmatrix} P_{k=1}^{(1)}(t_1) \\ \vdots \\ P_{k=1}^{(1)}(t_\tau) \end{bmatrix} & \cdots & w_{j=J}^{(1)} \begin{bmatrix} P_{k=K}^{(1)}(t_1) \\ \vdots \\ P_{k=K}^{(1)}(t_\tau) \end{bmatrix} \\ \vdots & & \vdots \\ w_{j=1}^{(1)} \begin{bmatrix} P_{k=1}^{(i)}(t_1) \\ \vdots \\ P_{k=1}^{(i)}(t_\tau) \end{bmatrix} & \cdots & w_{j=1}^{(1)} \begin{bmatrix} P_{k=K}^{(1)}(t_1) \\ \vdots \\ P_{k=K}^{(1)}(t_\tau) \end{bmatrix} \\ \vdots & \ddots & \vdots \\ w_{j=J}^{(1)} \begin{bmatrix} P_{k=1}^{(i)}(t_1) \\ \vdots \\ P_{k=1}^{(i)}(t_\tau) \end{bmatrix} & \cdots & w_{j=J}^{(1)} \begin{bmatrix} P_{k=K}^{(1)}(t_1) \\ \vdots \\ P_{k=K}^{(1)}(t_\tau) \end{bmatrix} \end{bmatrix}$$

Next $$U^* \breve{P} = \begin{bmatrix} \begin{bmatrix} \tilde{U}^* & \cdots \\ \vdots & \ddots & \vdots \\ & \cdots & \tilde{U}^* \end{bmatrix} & \cdots & \\ \vdots & \ddots & \vdots \\ & & \begin{bmatrix} \tilde{U}^* & \cdots \\ \vdots & \ddots & \vdots \\ & \cdots & \tilde{U}^* \end{bmatrix} \end{bmatrix} \breve{P}$$

Thus $$U^* \breve{P} = \begin{bmatrix} \begin{bmatrix} w_{j=1}^{(1)} \begin{bmatrix} P_{k=1}^{(1)}(\omega_1) \\ \vdots \\ P_{k=1}^{(1)}(\omega_\tau) \end{bmatrix} & \cdots & w_{j=1}^{(1)} \begin{bmatrix} P_{k=K}^{(1)}(\omega_1) \\ \vdots \\ P_{k=K}^{(1)}(\omega_\tau) \end{bmatrix} \\ \vdots & \ddots & \vdots \\ w_{j=J}^{(1)} \begin{bmatrix} P_{k=1}^{(1)}(\omega_1) \\ \vdots \\ P_{k=1}^{(1)}(\omega_\tau) \end{bmatrix} & \cdots & w_{j=J}^{(1)} \begin{bmatrix} P_{k=K}^{(1)}(\omega_1) \\ \vdots \\ P_{k=K}^{(1)}(\omega_\tau) \end{bmatrix} \end{bmatrix} \\ \vdots \\ \begin{bmatrix} w_{j=1}^{(1)} \begin{bmatrix} P_{k=1}^{(i)}(\omega_1) \\ \vdots \\ P_{k=1}^{(1)}(\omega_\tau) \end{bmatrix} & \cdots & w_{j=1}^{(1)} \begin{bmatrix} P_{k=K}^{(i)}(\omega_1) \\ \vdots \\ P_{k=K}^{(1)}(\omega_\tau) \end{bmatrix} \\ \vdots & \ddots & \vdots \\ w_{j=J}^{(1)} \begin{bmatrix} P_{k=1}^{(i)}(\omega_1) \\ \vdots \\ P_{k=1}^{(1)}(\omega_\tau) \end{bmatrix} & \cdots & w_{j=J}^{(1)} \begin{bmatrix} P_{k=K}^{(i)}(\omega_1) \\ \vdots \\ P_{k=K}^{(i)}(\omega_\tau) \end{bmatrix} \end{bmatrix} \end{bmatrix}$$

Now we can write $$F = \begin{bmatrix} \begin{bmatrix} \mathrm{diag}[DFT(c_1^{(1)}(t))] & \cdots \\ \vdots & \ddots & \vdots \\ & \cdots & \mathrm{diag}[DFT(c_J^{(1)}(t))] \end{bmatrix} \\ \vdots \\ \begin{bmatrix} \mathrm{diag}[DFT(c_1^{(i)}(t))] & \cdots \\ \vdots & \ddots & \vdots \\ & \cdots & \mathrm{diag}[DFT(c_J^{(i)}(t))] \end{bmatrix} \end{bmatrix}$$

Thus $$|F|^{-2} F^* = [\Gamma^{(1)} \cdots \Gamma^{(i)}]$$

where $$\Gamma^{(i)} = \begin{bmatrix} \begin{bmatrix} \frac{\tilde{c}_1^{*(i)}(\omega_1)}{\Sigma_{i'} S_1^{(i')}(\omega_1)} & \cdots \\ \vdots & \ddots & \vdots \\ & \cdots & \frac{\tilde{c}_1^{*(i)}(\omega_\tau)}{\Sigma_{i'} S_1^{(i')}(\omega_\tau)} \end{bmatrix} & \cdots \\ \vdots & \ddots & \vdots \\ & \cdots & \begin{bmatrix} \frac{\tilde{c}_J^{*(i)}(\omega_1)}{\Sigma_{i'} S_J^{(i')}(\omega_1)} & \cdots \\ \vdots & \ddots & \vdots \\ & \cdots & \frac{\tilde{c}_J^{*(i)}(\omega_\tau)}{\Sigma_{i'} S_J^{(i')}(\omega_\tau)} \end{bmatrix} \end{bmatrix}$$

Denominators may also include optional regularization terms to avoid singularities. Putting everything together, $$|F|^{-2} F^* U^* W^T P =$$

$$\begin{bmatrix} \sum_{(i)} w_{j=1}^{(i)} \tilde{P}_{k=1}^{(i)}(\omega) \frac{\tilde{C}_{j=1}^{*(i)}(\omega)}{\Sigma_{i'} S_{j=1}^{(i')}(\omega)} & \cdots & \sum_{(i)} w_{j=1}^{(i)} \tilde{P}_{k=K}^{(i)}(\omega) \frac{\tilde{C}_{j=1}^{*(i)}(\omega)}{\Sigma_{i'} S_{j=1}^{(i')}(\omega)} \\ \vdots & \ddots & \vdots \\ \sum_{(i)} w_{j=J}^{(i)} \tilde{P}_{k=1}^{(i)}(\omega) \frac{\tilde{C}_{j=J}^{*(i)}(\omega)}{\Sigma_{i'} S_{j=J}^{(i')}(\omega)} & \cdots & \sum_{(i)} w_{j=J}^{(i)} \tilde{P}_{k=K}^{(i)}(\omega) \frac{\tilde{C}_{j=J}^{*(i)}(\omega)}{\Sigma_{i'} S_{j=J}^{(i')}(\omega)} \end{bmatrix}$$

Where $$\sum_{(i)} w_j^{(i)} \tilde{P}_k^{(i)}(\omega) \frac{\tilde{C}_j^{*(i)}(\omega)}{\Sigma_{i'} S_j^{(i')}(\omega)} = \begin{bmatrix} \sum_{(i)} w_j^{(i)} \tilde{P}_k^{(i)}(\omega_1) \frac{\tilde{C}_j^{*(i)}(\omega_1)}{\Sigma_{i'} S_j^{(i')}(\omega_1)} \\ \vdots \\ \sum_{(i)} w_j^{(i)} \tilde{P}_k^{(i)}(\omega_1) \frac{\tilde{C}_j^{*(i)}(\omega_1)}{\Sigma_{i'} S_j^{(i')}(\omega_1)} \end{bmatrix}$$

This leads to the algorithm:

$$\hat{e}_{kj}(t) = IDFT\left\{\sum_{(i)} w_j^{(i)} \tilde{P}_k^{(i)}(\omega) \frac{\tilde{C}_j^{*(i)}(\omega)}{\Sigma_{i'} S_j^{(i')}(\omega)}\right\}$$

Which completes the proof. This algorithm can be used in place of pure cross-correlation in decoding signals when parallel coded excitations are used.

Error Metric:
We can evaluate $$\frac{\epsilon}{\sigma^2} = Tr[A^{-1}(A^{-1})^T]$$

As $$\frac{\epsilon}{\sigma^2} = Tr[A^+(A^+)^T] = Tr\left[\lambda^{-1}\breve{U}|F|^{-2}F^*U^*W^T \times \lambda^{-1}WF|F|^{-2}\breve{U}^*\right]$$
$$= Tr[\lambda^{-1}|F|^{-2}]$$
$$= \lambda^{-1}\sum_n \frac{1}{\Sigma_{i'} S_j^{(i')}(\omega_n)}$$

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A system comprising a multiplicity of transmitters and receivers, the transmitters comprising transmitting elements and processing parts, the processing parts adapted to cause the transmitting elements to transmit a code taken from a set of codes, the set of codes being a set of sparse-repeating interval (SRI) codes, non-repeating interval (NRI) codes or Hadamard NRI codes, in which the set of codes is the result of following a method comprising: selecting a sequence of intervals by a method comprising: A) Providing a seed sequence of intervals; B) finding a new interval that satisfies the properties of: i) the new interval and the sum of the new interval with the sum of the intervals from each point in the sequence to the end of the sequence are not existing intervals in the sequence ii) the new interval and the sum of the new interval with the sum of the intervals from each point in the sequence to the end of the sequence are not equal to any sum of the intervals from the beginning of the sequence up to any point in the sequence; iii) the new interval and the sum of the new interval with the sum of the intervals from each point in the sequence to the end of the sequence is not equal to any sum of the intervals from any point in the sequence to the end of the sequence; C) appending the new interval to the sequence of intervals; D) repeating steps B and C until the sequence of intervals has a desired length; and generating each code of the set of codes by creating a respective vector of non-zero numbers separated by zeros where the intervals between non-zero numbers is equal to the sequence of intervals in which the system forms part of an imaging system or multi-user communication system and the codes are generated for use in the system.

2. A system comprising a multiplicity of transmitters and receivers, the transmitters comprising transmitting elements and processing parts, the processing parts adapted to cause the transmitting elements to transmit a code taken from a set of codes, the set of codes being a set of sparse-repeating interval (SRI) codes, non-repeating interval (NRI) codes or Hadamard NRI codes, in which the set of codes is the result of following a method comprising: providing an initial set of sequences of intervals, which may be the empty set; creating a new sequence of intervals by: A) providing a first interval; B) selecting a next interval of the sequence of intervals with the following properties: i) the next interval and the sum of the next interval with the sum of the intervals from each point in the new sequence to the end of the new sequence are not existing intervals in the new sequence; ii) the next interval and the sum of the next interval with the sum of the intervals from each point in the new sequence to the end of the new sequence are not equal to any sum of the intervals from any point in the new sequence to the end of the new sequence; iii) the next interval and the sum of the next interval with the sum of the intervals from each point in the new sequence to the end of the new sequence are not equal to any sum of the intervals from the beginning of the new sequence to any point in the new sequence; and iv) the appending of the next interval to the new sequence would not result in a consecutive pair of not-necessarily-elementary-intervals already present in a sequence of intervals in the set of sequences of intervals, where the term "not-necessarily-elementary-interval" is understood to include sums of one or more consecutive intervals; C) appending the next interval to the new sequence of intervals; and D) repeating the steps B-C until the new sequence of intervals has a desired length; appending the new sequence of intervals to the set of sequences of intervals; repeating the steps of creating a new sequence of intervals and appending the new sequence of intervals to the set of sequences of intervals until the set of sequences of intervals has a desired size; and generating the set of codes by creating for each sequence of the set of sequences of intervals a vector of non-zero numbers separated by zeros where the intervals between the non-zero numbers are taken from the respective sequence, such that the vector of intervals between adjacent non-zero values of a specific SRI/NRI code is different than the vector of intervals corresponding to other codes in the set and such that the set of codes constitute a BSNO code set intervals in which the system forms part of an imaging system or multi-user communication system and the codes are generated for use in the system.

3. A transmitter comprising a transmitting element and a processing part, the processing part adapted to cause the transmitting element to transmit a code taken from a set of codes, each code being composed of a sequence of numbers, the set of codes having the properties that:
   each code of the set of codes is of the same length;
   each code of the set of codes comprises a respective vector of non-zero numbers separated by zeros where any intervals between non-zero numbers are not repeated;
   the intervals between non-zero numbers for each code of the set are equal to a common set of intervals;

in which each code of the set of codes uses a sequence of intervals between non-zero numbers that is the same sequence of intervals used by all other codes of the set of codes; and in which the transmitter forms part of an imaging system or multi-user communication system and the codes are generated for use in the system.

4. The transmitter of claim 3 in which the non-zero numbers of each code of the set of codes are taken from a respective row of a Hadamard matrix, or the non-zero numbers of each code of the set of codes are taken from a respective column of a Hadamard matrix.

5. The transmitter of claim 3 in which the non-zero numbers of each code have the same magnitude.

6. The transmitter of claim 5 in which the non-zero numbers of each code have a magnitude of unity.

7. The transmitter of claim 3 in which the numbers are real numbers.

8. The transmitter of claim 3, the transmitter having multiple transmitting elements, the transmitter having a processing part adapted to cause each transmitting element of the multiple transmitting elements to transmit a different code of the set of codes, the set of codes having the properties that:
   each code of the set of codes is of the same length;
   each code of the set of codes comprises a respective vector of non-zero numbers separated by zeros where any intervals between non-zero numbers are not repeated;
   the intervals between non-zero numbers for each code of the set are equal to a common set of intervals; and
the transmitter being in combination with a receiver having multiple receiving elements and a receiving processing part, the receiving processing part adapted to receive signals formed by the scattering from an object to be imaged of the codes transmitted from the transmitter and to apply a comparing algorithm comparing the received signals with the transmitted codes to obtain an estimate of the synthetic aperture data set, and processing the estimate of the synthetic aperture data set to form an image.

9. The imaging system of claim 8 in which the transmitting elements are the receiving elements.

\* \* \* \* \*